United States Patent
Tatsuno

(10) Patent No.: US 9,716,278 B2
(45) Date of Patent: Jul. 25, 2017

(54) POROUS ELECTRODE BASE MATERIAL, METHOD FOR MANUFACTURING SAME, AND PRECURSOR SHEET

(71) Applicant: Mitsubishi Chemical Corporation, Chiyoda-ku (JP)

(72) Inventor: Hiroto Tatsuno, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 213 days.

(21) Appl. No.: 14/382,723

(22) PCT Filed: Mar. 29, 2013

(86) PCT No.: PCT/JP2013/059565
§ 371 (c)(1),
(2) Date: Sep. 3, 2014

(87) PCT Pub. No.: WO2013/147174
PCT Pub. Date: Oct. 3, 2013

(65) Prior Publication Data
US 2015/0086901 A1    Mar. 26, 2015

(30) Foreign Application Priority Data

Mar. 30, 2012 (JP) .................. 2012-079928
Jul. 25, 2012 (JP) .................. 2012-164774

(51) Int. Cl.
| | |
|---|---|
| H01M 4/88 | (2006.01) |
| H01M 4/86 | (2006.01) |
| H01M 4/96 | (2006.01) |
| C04B 35/622 | (2006.01) |
| C04B 35/634 | (2006.01) |
| C04B 35/645 | (2006.01) |
| C04B 35/83 | (2006.01) |
| H01M 8/0234 | (2016.01) |
| H01M 8/0243 | (2016.01) |
| C04B 35/626 | (2006.01) |
| H01M 8/1007 | (2016.01) |
| H01M 4/90 | (2006.01) |
| H01M 8/0239 | (2016.01) |

(52) U.S. Cl.
CPC ....... *H01M 4/8652* (2013.01); *C04B 35/6269* (2013.01); *C04B 35/62218* (2013.01); *C04B 35/63444* (2013.01); *C04B 35/63476* (2013.01); *C04B 35/6455* (2013.01); *C04B 35/83* (2013.01); *H01M 4/8605* (2013.01); *H01M 4/8807* (2013.01); *H01M 8/0234* (2013.01); *H01M 8/0243* (2013.01); *H01M 8/1007* (2016.02); *C04B 2235/424* (2013.01); *C04B 2235/425* (2013.01); *C04B 2235/526* (2013.01); *C04B 2235/528* (2013.01); *C04B 2235/5256* (2013.01); *C04B 2235/5264* (2013.01); *C04B 2235/5272* (2013.01); *C04B 2235/5292* (2013.01); *C04B 2235/604* (2013.01); *C04B 2235/616* (2013.01); *H01M 4/90* (2013.01); *H01M 4/9083* (2013.01); *H01M 8/0239* (2013.01); *Y02P 70/56* (2015.11)

(58) Field of Classification Search
CPC ........ C04B 35/63444; C04B 35/63476; C04B 35/6455; C04B 35/83; C04B 35/6269; C04B 35/62218; C04B 2235/424; C04B 2235/52; H01M 8/1002; H01M 4/8807; H01M 8/0234; H01M 8/0243; H01M 4/8605; H01M 4/8652; Y02E 60/521; Y02P 70/56

See application file for complete search history.

(56) References Cited

U.S. PATENT DOCUMENTS

| | | | |
|---|---|---|---|
| 4,985,316 A | 1/1991 | Bose et al. | |
| 5,026,402 A | 6/1991 | Bose et al. | |
| 6,713,034 B2 | 3/2004 | Nakamura et al. | |
| 6,812,171 B2 | 11/2004 | Shimazaki et al. | |
| 7,297,445 B2 | 11/2007 | Nakamura et al. | |
| 7,959,750 B2 | 6/2011 | Nishida et al. | |
| 8,343,452 B2 | 1/2013 | Ji et al. | |
| 2002/0029842 A1 | 3/2002 | Nishida et al. | |

(Continued)

FOREIGN PATENT DOCUMENTS

| | | | |
|---|---|---|---|
| JP | 60-59660 | | 4/1985 |
| JP | 60-122711 | † | 7/1985 |

(Continued)

OTHER PUBLICATIONS

International Search Report Issued Apr. 24, 2012 in PCT/JP2012/051177 Filed Jan. 27, 2011(with English translation).
Rejection Notice issued Aug. 20, 2013 in Japanese Patent Application No. 2012-504215 (with partial English translation).
Notification issued Sep. 24, 2014 in Japanese Patent Application No. 2013-218365 (with partial English translation).
Extended European Search Report issued Feb. 27, 2015 in Patent Application No. 13767284.6.

(Continued)

*Primary Examiner* — Muhammad Siddiquee
(74) *Attorney, Agent, or Firm* — Oblon, McClelland, Maier & Neustadt, L.L.P.

(57) ABSTRACT

The present invention relates to a method for manufacturing a porous electrode base material including the following steps [1] to [3]: [1] a step for dispersing short carbon fibers (A) to form a sheet-form product; [2] a step for adding, to the sheet-form product, at least one phenolic resin (c) selected from a group consisting of a water soluble phenolic resin and a water dispersible phenolic resin along with carbon powder (d) to form a precursor sheet; and [3] a step for carbonizing the precursor sheet at the temperature of 1000° C. or higher, after the step [2].

16 Claims, 4 Drawing Sheets

(56) References Cited

U.S. PATENT DOCUMENTS

| | | | |
|---|---|---|---|
| 2002/0175073 A1 | 11/2002 | Nakamura et al. | |
| 2003/0194557 A1* | 10/2003 | Wilde | D21H 13/50 |
| | | | 428/408 |
| 2004/0227265 A1 | 11/2004 | Nishida et al. | |
| 2005/0150620 A1* | 7/2005 | Hamada | D21H 13/50 |
| | | | 162/152 |
| 2006/0180798 A1* | 8/2006 | Chida | C04B 35/83 |
| | | | 252/502 |
| 2007/0087120 A1 | 4/2007 | Connors, Jr. et al. | |
| 2007/0166524 A1 | 7/2007 | Nakamura et al. | |
| 2008/0268297 A1 | 10/2008 | Quayle et al. | |
| 2011/0226431 A1 | 9/2011 | Nishida et al. | |
| 2011/0294036 A1* | 12/2011 | Sumioka | D04H 1/4242 |
| | | | 429/482 |
| 2012/0100456 A1 | 4/2012 | Sumioka et al. | |
| 2012/0141911 A1 | 6/2012 | Sumioka et al. | |
| 2013/0323620 A1 | 12/2013 | Tatsuno et al. | |

FOREIGN PATENT DOCUMENTS

| | | | |
|---|---|---|---|
| JP | 60-122711 A † | 7/1985 | |
| JP | 62-154470 | 7/1987 | |
| JP | 1 253164 | 10/1989 | |
| JP | 1-253164 | 10/1989 | |
| JP | 11-43890 | 2/1999 | |
| JP | 2001-240477 | 9/2001 | |
| JP | 2002-270191 A | 9/2002 | |
| JP | 2002-327355 | 11/2002 | |
| JP | 2003-151568 | 5/2003 | |
| JP | 2003-213563 | 7/2003 | |
| JP | 2003-286085 | 10/2003 | |
| JP | 2004-100102 | 4/2004 | |
| JP | 2004 134108 | 4/2004 | |
| JP | 2004-259711 A | 9/2004 | |
| JP | 2004-288489 | 10/2004 | |
| JP | 2004-296176 | 10/2004 | |
| JP | 2004 307815 | 11/2004 | |
| JP | 2004 311431 | 11/2004 | |
| JP | 2005 116338 | 4/2005 | |
| JP | 2005-240224 | 9/2005 | |
| JP | 3699447 | 9/2005 | |
| JP | 2005-281871 | 10/2005 | |
| JP | 2005-299069 | 10/2005 | |
| JP | 4591128 B † | 10/2005 | |
| JP | 2005-317240 | 11/2005 | |
| JP | 2006 56960 | 3/2006 | |
| JP | 2006 143478 | 6/2006 | |
| JP | 2006-143478 † | 6/2006 | |
| JP | 2006-143478 A † | 6/2006 | |
| JP | 2007-115574 | 5/2007 | |
| JP | 2007-173009 | 7/2007 | |
| JP | 2007-176750 † | 7/2007 | |
| JP | 2007-176750 A † | 7/2007 | |
| JP | 2007 244997 | 9/2007 | |
| JP | 2007-273466 | 10/2007 | |
| JP | 2008 503043 | 1/2008 | |
| JP | 2009 84382 | 4/2009 | |
| JP | 2009-238748 | 10/2009 | |
| JP | 2009-283259 | 12/2009 | |
| JP | 2010-192379 A | 9/2010 | |
| JP | 2010-257748 | 11/2010 | |
| JP | 2011 258395 | 12/2011 | |
| WO | WO 01/22509 A1 | 3/2001 | |
| WO | 01 56103 | 8/2001 | |
| WO | WO 02/42534 A1 | 5/2002 | |
| WO | 2005 124902 | 12/2005 | |
| WO | WO 2011/004853 A1 | 1/2011 | |
| WO | WO 2011/065327 A1 | 6/2011 | |
| WO | 2012 102195 | 8/2012 | |

OTHER PUBLICATIONS

Office Action issued Apr. 14, 2015 in Japanese Patent Application No. 2014-121731 (with English language translation).
International Search Report Issued Jul. 2, 2013 in PCT/JP13/059565 Filed Mar. 29, 2013.
Shigehiko Yamada, *Carbon Material Application Techniques*, Nikkan Kogyo Shimbon Ltd.. first edition, pp. 1 and 117, Table 2 47, Sep. 30, 1992.†
The Chemical Society of Japan, *Chemical Handbook*, Maruzen Co., Ltd., third revised edition, pp. 1 and I-24, Table 2.3, Aug. 25, 1984.†
Chemical Handbook, p. I-24, Jun. 25, 1984, Publisher: Kumao Ebihara, Tokyo, Japan.†
Shigehiko Yamada, Carbon Material Application Technology, p. 117, Sep. 30, 1992, Publisher: Fujiyoshi Toshio, Tokyo, Japan.†

\* cited by examiner
† cited by third party

POROUS ELECTRODE BASE MATERIAL, METHOD FOR MANUFACTURING SAME, AND PRECURSOR SHEET

TECHNICAL FIELD

The present invention relates to a porous electrode base material which can be used for a fuel cell, a method for manufacturing the same, and a precursor sheet used for manufacturing the porous electrode base material. The present application claims the priority right based on Japanese Patent Application No. 2012-079928, which was filed on Mar. 30, 2012, and Japanese Patent Application No. 2012-164774, which was filed on Jul. 25, 2012, and they are incorporated herein by reference.

BACKGROUND ART

A gas diffusion electrode base material installed in a fuel cell is conventionally a porous electrode base material composed of a paper-like carbon/carbon composite which is obtained by sheet making of short carbon fibers for increasing mechanical strength, binding short carbon fibers with a thermosetting resin, and carbonizing an organic polymer with calcining at a high temperature (see, Patent Document 1).

Further, a porous electrode base material having carbon fibers and carbonaceous powder bound to each other with a resin carbide for enhancing the conductivity or mechanical strength in the thickness direction is suggested (see, Patent Document 2).

CITATION LIST

Patent Document

Patent Document 1: WO 2001/056103 A
Patent Document 2: JP 2004-311431 A

DISCLOSURE OF THE INVENTION

Problem to be Solved by the Invention

However, the method of Patent Document 1 tends to have a complex production process, and there is a case of having high cost. Meanwhile, intrinsic resistance in the thickness direction can be surely reduced according to the method of Patent Document 2. However, it is very unlikely that the paper-like carbon/carbon composite is used without any change in a fuel cell. In general, a water repellent treatment using a fluorine resin or a process of densifying a surface consisting of carbon particles (MPL: Micro Porous Layer) is performed first followed by mounting on a cell. In other words, although lowering contact resistance with an adjacent member is more important that lowering the intrinsic resistance of a carbon/carbon composite from the viewpoint of a fuel cell as a whole, until now no porous electrode base material has been suggested from such point of view.

The invention is made in view of the above aspects, and an object of the invention is to provide a porous electrode base material which has low production cost and sufficient conductivity and exhibits a good power generation performance even without MPL, and a method for manufacturing the same.

Means for Solving Problem

Inventors of the invention found that the aforementioned problems can be solved by the following inventions (1) to (15). The following (1) to (4) are directed to a manufacturing method of the invention, the following (5) to (10) are directed to a porous electrode base material which can be manufactured by the manufacturing method of the invention, and the following (11) to (15) are directed to a precursor sheet which is produced during the manufacturing method of the invention.

(1) A method for manufacturing a porous electrode base material, the method including the following steps [1] to [3]:

[1] a step for dispersing short carbon fibers (A) to form a sheet-form product;

[2] a step for adding, to the sheet-form product, at least one phenolic resin (c) selected from a group consisting of a water soluble phenolic resin and a water dispersible phenolic resin along with carbon powder (d) to form a precursor sheet; and

[3] a step for carbonizing the precursor sheet at the temperature of 1000° C. or higher, after the step [2].

(2) The manufacturing method described in the above (1), in which a step [4] for performing an entanglement treatment of the sheet-form product is included between the step [1] and the step [2], a step [7] for performing a drying treatment of the sheet-form product is included between the step [4] and the step [2], a step [5] for heating and compressing the precursor sheet at the temperature of 100 to 250° C. is included between the step [2] and the step [3], and a step [6] for performing a drying treatment of the precursor sheet is included between the step [2] and the step [5].

(3) The manufacturing method described in the above (1) or (2), characterized in that an average particle diameter of the substantial particles or agglomerates of the carbon powder (d) in the step [2] is 0.1 to 50 μm.

(4) The manufacturing method described in any one of the above (1) to (3), characterized in that a water repellent treatment step [8] in which a fluorine-based resin dispersion with a solid content of 1 to 30% by mass is added to the porous electrode base material followed by further drying and performing a heat treatment at 300 to 390° C. is included after the step [3].

(5) A porous electrode base material containing a sheet-form structure having short carbon fibers (A) bound by a resin carbide (C) derived from at least one selected from a group consisting of a water soluble phenolic resin and a water dispersible phenolic resin, in which carbon powder (d) is localized in the vicinity of the surface layer of a single side or both sides of the sheet-form structure.

(6) A porous electrode base material containing a sheet-form structure having short carbon fibers (A) bound by a resin carbide (C), in which a region having the short carbon fibers (A) and carbon powder (d) bound by the resin carbide (C) is localized in the vicinity of the surface layer of a single side or both sides of the sheet-form structure.

(7) A porous electrode base material containing a sheet-form structure having short carbon fibers (A) bound by a resin carbide (C), in which a region having the short carbon fibers (A) and carbon powder (d) bound by the resin carbide (C) is included in the vicinity of the surface layer of a single side or both sides of the sheet-form structure, a pore occupancy in a region X from the surface of a plane having the aforementioned region to the depth of 20 μm is less than 30% and a pore occupancy in a region Y from the center of the sheet-form structure to the depth of 40 μm in the thickness direction is 50 to 90%.

(8) A porous electrode base material containing a sheet-form structure having short carbon fibers (A) bound by carbon fibers (B) with a fiber diameter of 0.1 to 5 μm and a resin carbide (C) derived from at least one selected from a group consisting of a water soluble phenolic resin and a water dispersible phenolic resin, in which the short carbon fibers (A) form a three-dimensional entanglement structure in the sheet-form structure and carbon powder (d) is localized in the vicinity of the surface layer of a single side or both sides of the sheet-form structure.

(9) A porous electrode base material containing a sheet-form structure having short carbon fibers (A) bound by carbon fibers (B) with a fiber diameter of 0.1 to 5 μm and a resin carbide (C), in which the short carbon fibers (A) form a three-dimensional entanglement structure in the sheet-form structure and a region having the short carbon fibers (A) and carbon powder (d) bound by the resin carbide (C) is localized in the vicinity of the surface layer of a single side or both sides of the sheet-form structure.

(10) A porous electrode base material containing a sheet-form structure having short carbon fibers (A) bound by carbon fibers (B) with a fiber diameter of 0.1 to 5 μm and a resin carbide (C), in which the short carbon fibers (A) form a three-dimensional entanglement structure in the sheet-form structure, a region having the short carbon fibers (A) and carbon powder (d) bound by the resin carbide (C) is included in the vicinity of the surface layer of a single side or both sides of the sheet-form structure, a pore occupancy in a region X from the surface of a plane having the aforementioned region to the depth of 20 μm is less than 30%, and a pore occupancy in a region Y from the center of the sheet-form structure to the depth of 40 μm in the thickness direction is 50 to 90%.

(11) A precursor sheet containing a sheet-form structure having short carbon fibers (A) bound by a phenolic resin (c), in which carbon powder (d) is localized in the vicinity of the surface layer of a single side or both sides of the sheet-form structure.

(12) A precursor sheet containing a sheet-form structure having short carbon fibers (A) bound by a phenolic resin (c), in which a region having the short carbon fibers (A) and carbon powder (d) bound by the phenolic resin (c) is localized in the vicinity of the surface layer of a single side or both sides of the sheet-form structure.

(13) A precursor sheet containing a sheet-form structure having short carbon fibers (A) bound by a phenolic resin (c), in which a region having the short carbon fibers (A) and carbon powder (d) bound by the phenolic resin (c) is included in the vicinity of the surface layer of a single side or both sides of the sheet-form structure, a pore occupancy in a region X from the surface of a plane having the aforementioned region to the depth of 20 μm is less than 25% and a pore occupancy in a region Y from the center of the sheet-form structure to the depth of 40 μm in the thickness direction is 35 to 70%.

(14) A precursor sheet containing a sheet-form structure having short carbon fibers (A) and carbon fiber precursor short fibers (b) bound by a phenolic resin (c), in which the short carbon fibers (A) form a three-dimensional entanglement structure in the sheet-form structure and a region having the short carbon fibers (A) and carbon powder (d) bound by the phenolic resin (c) is localized in the vicinity of the surface layer of a single side or both sides of the sheet-form structure.

(15) The precursor sheet described in any one of the above (12) to (14), in which the phenolic resin (c) is at least one selected from a group consisting of a water soluble phenolic resin and a water dispersible phenolic resin.

Meanwhile, the following (16) to (31) are also one of the embodiments of the invention.

(16) The manufacturing method described in the above (1), in which the step [1] is a step for dispersing the short carbon fibers (A) and fibrillar fibers (b') to form a sheet-form product.

(17) The manufacturing method described in the above (1) or (16), characterized in that a dispersion (e) in which at least one phenolic resin (c) selected from a group consisting of a water soluble phenolic resin and a water dispersible phenolic resin and the carbon powder (d) are mixedly present is added to the sheet-form product in the step [2] to form a precursor sheet.

(18) The manufacturing method described in any one of the above (1), (16) and (17), in which a step [4] for performing an entanglement treatment of the sheet-form product is included between the step [1] and the step [2].

(19) The manufacturing method described in any one of the above (1) and (16) to (18), in which a step [7] for performing a drying treatment of the sheet-form product is included between the step [1] and the step [2].

(20) The manufacturing method described in any one of the above (1) and (16) to (19), in which the step [1] is a step for producing a sheet-form product having the short carbon fibers (A) and one or both of carbon fiber precursor short fibers (b1) and fibrillar fibers (b2) dispersed therein.

(21) The manufacturing method described in any one of the above (1) and (16) to (20), in which a step [5] for heating and compressing the precursor sheet at the temperature of 100 to 250° C. is included between the step [2] and the step [3].

(22) The manufacturing method described in the above (21), in which a step [6] for drying the precursor sheet is included between the step [2] and the step [5].

(23) The manufacturing method described in any one of the above (1) to (4) and (16) to (22), in which a content of a water soluble binder in the sheet-form product is 10 g/m² or less in the step [1].

(24) The manufacturing method described in any one of the above (1) to (4) and (16) to (23), in which at least one phenolic resin (c) selected from a group consisting of a water soluble phenolic resin and a water dispersible phenolic resin is added, along with the carbon powder (d), by spraying, dropwise addition, or flowing to the sheet-form product in the step [2].

(25) The manufacturing method described in any one of the above (1) to (4) and (16) to (24), in which a viscosity of the phenolic resin (c) in the step [2] is 0.2 mPa·s to 500 mPa·s.

(26) The manufacturing method described in any one of the above (1) to (4) and (16) to (25), characterized in that the addition amount of the carbon powder (d) in the step [2] is such that the mass ratio of the carbon powder (d) relative to the solid matter of the phenolic resin (c) is 0.001 to 3.0.

(27) A porous electrode base material manufactured by the method described in any one of the above (1) to (4) and (16) to (26).

(28) A membrane-electrode assembly using the porous electrode base material described in any one of the above (5) to (15).

(29) A solid polymer type fuel cell using the membrane-electrode assembly described in the above (28).

(30) A precursor sheet as a sheet-form structure having short carbon fibers (A) and carbon fiber precursor short fibers (b) bound by at least one phenolic resin (c) selected from a group consisting of a water soluble phenolic resin and a water dispersible phenolic resin, in which the short carbon fibers (A) form a three-dimensional entanglement structure in the sheet-form structure and carbon powder (d) is localized in the vicinity of the surface layer of a single side or both sides of the sheet-form structure.

(31) A precursor sheet as a sheet-form structure having short carbon fibers (A) and carbon fiber precursor short fibers (b) bound by a phenolic resin (c), in which the short carbon fibers (A) form a three-dimensional entanglement structure in the sheet-form structure, a region having the short carbon fibers (A) and carbon powder (d) bound by the phenolic resin (c) is included in the vicinity of the surface layer of a single side or both sides of the sheet-form structure, a pore occupancy in a region X from the surface of a plane having the aforementioned region to the depth of 20 μm is less than 25%, and a pore occupancy in a region Y from the center of the sheet-form structure to the depth of 40 μm in the thickness direction is 35 to 70%.

Effect of the Invention

According to the invention, it is possible to provide a porous electrode base material having low production cost and sufficient conductivity and exhibiting a good power generation performance even without MPL, and a method for manufacturing the same. Further, it is also possible to provide a membrane-electrode assembly containing the porous electrode base material and a solid polymer type fuel cell.

MODE(S) FOR CARRYING OUT THE INVENTION

Figure 1:
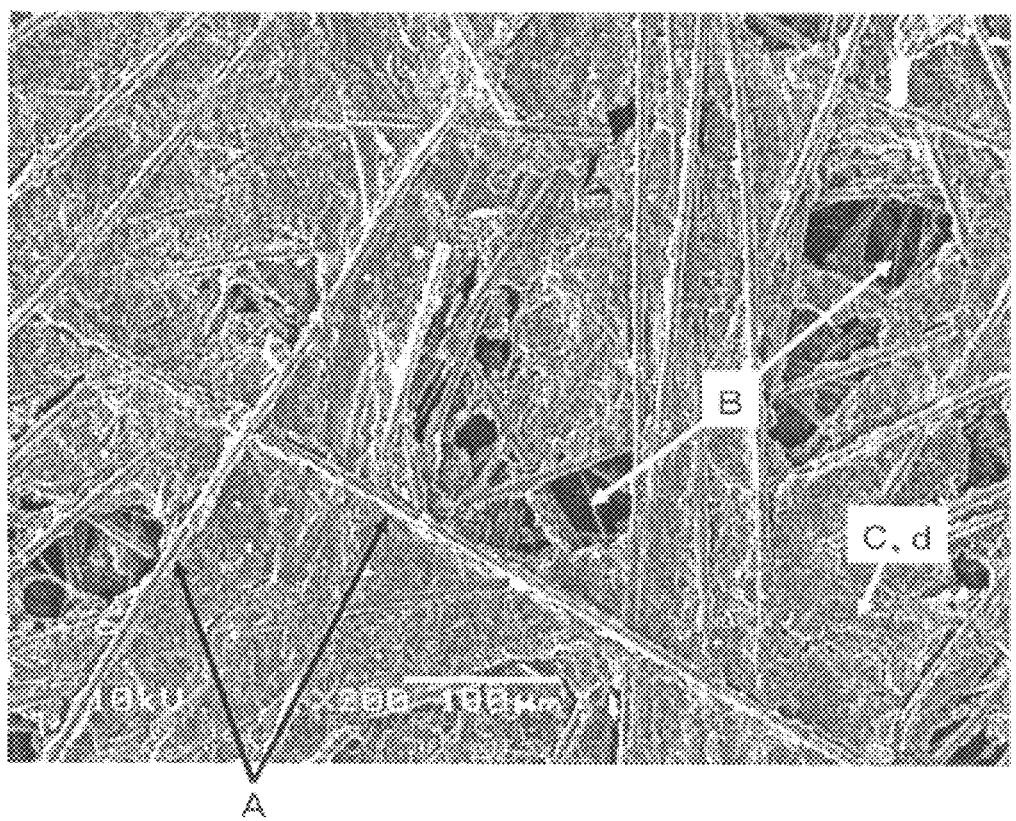
FIG. 1 is a drawing illustrating an example of a scanning electron microscopic image of the surface of a porous electrode base material of the invention.

<<Method for Manufacturing Porous Electrode Base Material>>

The manufacturing method of the invention includes the following steps [1] to [3]:

[1] a step for dispersing short carbon fibers (A) to form a sheet-form product (step [1] for producing a sheet-form product);

[2] a step for adding, to the sheet-form product, at least one phenolic resin (c) selected from a group consisting of a water soluble phenolic resin and a water dispersible phenolic resin along with carbon powder (d) to form a precursor sheet (step [2] for resin addition); and

[3] a step for carbonizing the precursor sheet at the temperature of 1000° C. or higher, after the step [2] (step [3] for carbonizing treatment).

It is possible to include, between the step [1] and the step [2], a step [4] for performing an entanglement treatment of the sheet-form product (step [4] for entanglement treatment).

Meanwhile, by having the step [1] as a step for producing a sheet-form product in which the short carbon fibers (A) and fibrillar fibers (b2) are dispersed or by including, between the step [1] and the step [2], the step [4] for performing an entanglement treatment of the sheet-form product in which the short carbon fibers (A) are dispersed, it is possible to promote the fiber opening of the short carbon fibers (A) to short fibers and increase easily the strength of the precursor sheet.

It is also possible to include, between the step [1] and the step [2], a step [7] for performing a drying treatment of the sheet-form product. Meanwhile, the sheet-form product indicates a sheet-form product in which at least the short carbon fibers (A) are dispersed (it is also possible that the precursor fibers (b) described below are dispersed therein).

When the manufacturing method of the invention has the step [4], it is also possible to include, between the step [1] and the step [4] and/or the step [4] and the step [2], a step [7] for performing a drying treatment of the sheet-form product. Meanwhile, when the step [7] is performed between the step [1] and the step [4], the sheet-form product indicates a sheet-form product in which at least the short carbon fibers (A) are dispersed (it is also possible that the precursor fibers (b) described below are dispersed therein), and when the step [7] is performed between the step [4] and the step [2], the sheet-form product indicates a sheet-form product obtained after the entanglement treatment.

It is also possible to include, between the step [2] and the step [3], a step [5] for heating and compressing the precursor sheet at the temperature of 100° C. to 250° C. (step [5] for heating and compression).

It is also possible to include, between the step [2] and the step [5], a step [6] for performing a drying treatment of the precursor sheet (step [6] for drying treatment).

<Step [1] for Producing Sheet-Form Product>

For producing the sheet-form product, a sheet making method such as a wet method in which the short carbon fibers (A) are dispersed in a liquid medium and subjected to sheet making or a dry method in which the short carbon fibers (A) are dispersed in air and allowed to be stacked by falling can be applied. From the viewpoint of sheet strength or homogeneity of fiber dispersion, the wet method is preferable.

It is also possible to disperse the precursor fibers (b) along with the short carbon fibers (A), and according to entanglement of the short carbon fibers (A) and the precursor fibers (b), strength of the sheet-form product is further enhanced and it can be prepared in substantially binder-free form. In other words, the sheet-form product may consist of the short carbon fibers (A) or consist of the short carbon fibers (A) and the precursor fibers (b). Meanwhile, the precursor fibers (b) indicate one or both of the carbon fiber precursor short fibers (b1) and the fibrillar fibers (b2).

Further, in the invention, a small amount of an organic polymer compound may be used as a binder in the sheet-form product. The method for adding a binder to the sheet-form product is not particularly limited. For example, the short carbon fibers (A) or the precursor fibers (b) and a binder may be dispersed together, or a binder may be added to the sheet-form product after a sheet-form product containing the short carbon fibers (A) is formed.

The organic polymer compound used as a binder is not particularly limited. Examples thereof include water soluble binders such as polyvinyl alcohol (PVA), polyacrylic acid, or carboxymethyl cellulose, or heat-sealing polyester-based or polyolefin-based binders. The binder may be a solid like fibers or particles, or may be liquid.

As for the medium for dispersing a fibrillar product such as the short carbon fibers (A) and the precursor fibers (b), a medium in which the fibrillar product is not dissolved, that is, water, alcohol, or the like, can be mentioned. However, from the viewpoint of productivity, water is preferable.

The sheet-form product can be manufactured either by a continuous method or by a batch method. However, the sheet-form product is preferably produced by a continuous method, considering the productivity and mechanical strength of the sheet-form product. The weight per unit area of sheet-form product is preferred to be approximately 10 to 200 g/m$^2$, and the thickness of sheet-form product is preferred to be approximately 20 to 400 μm.

<Step [2] for Resin Addition>

The method for producing a precursor sheet by adding to a sheet-form product at least one phenolic resin (c) selected from a group consisting of a water soluble phenolic resin and a water dispersible phenolic resin along with the carbon powder (d) is not particularly limited as long as it is a method capable of adding the phenolic resin and the carbon powder (d) to the sheet-form product. Hereinbelow, at least one phenolic resin (c) selected from a group consisting of a water soluble phenolic resin and a water dispersible phenolic resin may be also referred to as the phenolic resin (c) or the resin (c).

First, the dispersion (e) in which the resin (c) and the carbon powder (d) are mixedly present is prepared. The dispersion (e) is prepared by adding the carbon powder (d) to at least one phenolic resin (c) selected from a group consisting of a water soluble phenolic resin and a water dispersible phenolic resin followed by stirring. As for the carbon powder (d), a single type may be used or carbon powder of plural and different kinds can be used in combination. The dispersion (e) is required to have a characteristic that, when added from one surface of the sheet-form product, the resin (c) infiltrates to the back surface while the carbon powder (d) is localized on the addition side without reaching the back surface. In order to have such dispersion (e), attention may be paid to the following points.

The viscosity of the resin (c) to become a base is preferably 0.2 mPa·s or more from the viewpoint that water as a solvent or dispersion medium is present in a liquid state. From the viewpoint of permeability into the sheet-form product, the viscosity is preferably 500 mPa·s or less. In general, when the resin (c) is a water soluble phenolic resin, the viscosity of stock solution is 500 mPa·s or less. However, when the resin (c) is a water dispersible phenolic resin, the viscosity of stock solution may be more than 500 mPa·s in some cases, and in such case, it can be used after dilution with a solvent like water. The solid matter concentration in the resin (c) is preferably 1% by mass or more from the viewpoint of exhibiting mechanical strength and conductivity when prepared as a porous electrode base material. For having a dispersion with low viscosity and high permeability, it is preferably 40% by mass or less and more preferably 5 to 35% by mass. A commercially available product can be used after dilution with water or used directly as the resin (c) as it is. To promote the dispersion of the solid matter of the resin (c) or the carbon powder (d), a surfactant may be added in a small amount. The addition amount of the surfactant is, for suppressing formation of bubbles as much as possible, preferably 0 to 3% by mass relative to the dispersion.

The addition amount of the carbon powder (d) relative to the dispersion is preferably such that the mass ratio of the carbon powder (d) relative to the solid matter of the resin (c) is 3.0 or less so as not to have excessively high viscosity of the dispersion (e) or excessively low gas permeability of the porous electrode base material. From the viewpoint of improving the conductivity of the porous electrode base material, it is preferably 0.001 or more. More preferably, it is 0.01 to 2.0, and particularly preferably 0.1 to 1.0.

As for the carbon powder (d), commercially available carbon black, graphite, milled fiber or the like may be used. However, for having a size allowing easy localization on a surface of the porous electrode base material, particles or agglomerates substantially having a size of approximately 0.1 to 50 μm are preferable. Further, from the viewpoint of conductivity of the porous electrode base material, it is preferable to use pyrolytic graphite, flake graphite, spherical graphite, acetylene black, ketjen black, or the like, for example.

According to the method described above, the total addition amount of the solid matter of the phenolic resin (c) and the carbon powder (d) is 20 to 180 parts by mass relative to 100 parts by mass of the sheet-form product (solid matter). Controlling the addition amount is performed by nipping regardless of the method for addition.

With regard to the method for stirring the dispersion (e), it is sufficient to perform mild stirring to the extent at which the solid matter of the phenolic resin (c) or the carbon powder (d) is not precipitated. When the shearing force for stirring is excessively high, aggregation of the solid matter of the phenolic resin (c) or the carbon powder (d) is facilitated or significant formation of bubbles is caused, and therefore undesirable.

With regard to the method for adding the dispersion (e), the addition can be made by discharging (spraying, dropwise addition, or flowing) the phenolic resin (c) and the carbon powder (d) to the sheet-form product. For example, a method in which a spray nozzle is used to spray or add dropwise the resin (c) and the carbon powder (d) on a surface of a sheet-form product, a method in which a discharge-type coater such as a curtain coater is used to flow resin (c) on a surface of a sheet-form product for uniform coating, or the like may be used. It is also possible to coat uniformly the phenolic resin (c) and the carbon powder (d) on a surface of the sheet-form product by using a coater like kiss coater. The method for supplying a solution preparation containing the phenolic resin (c) and the carbon powder (d) is not limited specifically. For example, compressed feeding by a compressor tank, feeding by a metering pump, suction methods using self-suction force or the like may be used.

A two-fluid nozzle having separate channels for liquid and gas is preferred for a spray nozzle, because channels are less likely to be clogged, and thus maintenance is easier. As for such nozzles, double-tube nozzles, vortex-flow atomization nozzles disclosed in JP 2007-244997 A, or the like may be used. The gas used for spraying purposes is not limited specifically as long as it does not react with the phenolic resin (c) or the carbon powder (d) or does not facilitate curing of phenolic resin (c). Usually, compressed air is preferably used.

As for a nozzle for dropwise addition, needle-tube nozzles generally known as drip needles or a high pressure liquid injection nozzles other than aforementioned spray nozzle may be used. It is preferable to use those having pore diameter which does not cause clogging with the phenolic resin (c) or the carbon powder (d).

Meanwhile, for infiltration of the discharged resin (c) into sheet-form product, or for removal of the excess resin (c) or the carbon powder (d) to have a constant adhesion amount on the sheet-form product, a squeezer (nip) device may also be used in combination. Further, instead of nipping, the resin (c) may be infiltrated into the sheet-form product by spraying gas on a surface of the sheet-form product to which the resin (c) and the carbon powder (d) have been discharged (sprayed, for example) or by suctioning from the back side of the sheet-form product. At that time, it is preferable that the carbon powder (d) is localized on a discharged side instead of being migrated along with the resin (c) to the inside of the sheet-form product. By performing these steps continuously, a constant adhesion amount of the resin (c) and the carbon powder (d) on the sheet-form product can be obtained. It is also possible to perform a drying treatment after adding the resin (c) and the carbon powder (d).

Adding the resin (c) and the carbon powder (d) may be repeated multiple times. Namely, after the resin (c) and the carbon powder (d) are added and the dispersant is dried, the resin (c) and the carbon powder (d) may further be added. Alternatively, after inverting the sheet-form product added with a resin and carbon powder, which is under production, the resin (c) and the carbon powder (d) may be added from the opposite side. In addition, such procedures may be repeated. The number of times to add the resin (c) and the carbon powder (d) is not particularly limited, but the number is preferred to be smaller to reduce production costs. When the addition is made for multiple times, it is possible to use the same type of the phenolic resin (c) or to use those with a different resin composition or concentration. It is also possible to use the same type of the carbon powder (d) or to use those with a different composition or concentration. Further, the addition amount of the resin (c) and the carbon powder (d) may be uniform in a thickness direction of the sheet-form product, or it may have a concentration gradient.

Meanwhile, as described above, because a precursor sheet is produced by adding at least one phenolic resin (c) selected from a group consisting of a water soluble phenolic resin and a water dispersible phenolic resin along with the carbon powder (d) to the sheet-form product, the carbon powder (d) is localized in the vicinity of the surface layer of a single side or both sides of the precursor sheet to be obtained. When the dispersion (e) of the resin (c) and the carbon powder (d) is added from a single side, the carbon powder (d) is localized on a single side of the precursor sheet. When the dispersion (e) of the resin (c) and the carbon powder (d) is added from both sides, the carbon powder (d) is localized on both sides of the precursor sheet.

As described herein, the expression "the carbon powder (d) is localized in the vicinity of the surface layer of a single side or both sides of the sheet-form structure" means that, compared to the inside (inner layer) of the precursor sheet, the carbon powder (d) is present more on a surface, or on a surface and in the vicinity of a surface layer of the precursor sheet. Meanwhile, the "surface" indicates a surface which can be observed without performing a special processing such as cutting or polishing. Meanwhile, "in the vicinity of the surface layer" indicates a region with width in the thickness direction, including the surface. Specifically, (i) when the cross section of the precursor sheet is observed, pores in the vicinity of the surface layer are filled with the carbon powder (d) so that pore occupancy is relatively low, and thus it is difficult to identify each fiber. On the other hand, the pore occupancy is relatively high in the inner layer, and thus it has a state which allows easy identification of each fiber. Further, it is preferable to have (ii) a state in which, when observation is made from the surface of the precursor sheet, the vicinity of the surface layer exhibits almost no fibers or pores other than the outermost surface as the surface of the precursor sheet is coated with a mixture of the resin (c) and the carbon powder (d).

For obtaining a cross section of the precursor sheet, it is preferable to use a cross section polisher (CP) based on ion etching or focused ion beam (FIB) device as common mechanical polishing may easily cause polishing dent or flowing on an interface at which materials are bonded. As for the observation of the cross section or surface of the precursor sheet, it is not particularly limited as long as it is a method allowing easy identification of fibers or particles. However, a scanning electron microscope having high depth of field is preferably used. The magnification ratio for observing the cross section is preferably magnification ratio for covering the whole at least in the thickness direction (that is, a single photographic image contains from a surface layer at one side to a surface layer at the other side). Further, for calculating the porosity from the observed photographic image, an image analysis software capable of performing binarization of gray scale image and area calculation is preferably used.

The "state in which no fibers or pores are shown other than the outermost surface" as described in above (ii) indicates that, in the photographic image for observing the surface of the precursor sheet, the area of occupancy by the mixture of the resin (c) and the carbon powder (d) is larger than the area of occupancy by fibers or pores other than the outermost surface. At that time, fibers or pores from other than the outermost surface may be partially seen.

<Step [3] for Carbonization>

As for a method for carbonizing the precursor sheet, any method may be employed as long as the carbonization is conducted at temperatures continuously rising from room temperature. The carbonization is conducted at 1000° C. or higher. To provide excellent conductivity, the carbonization is preferred to be performed under inert atmosphere in a temperature range of 1000° C. or higher and 2400° C. or lower. Prior to the carbonization treatment, it is also possible to perform pre-carbonization treatment under inert atmosphere in a temperature range of 300° C. or higher but lower than 1000° C. By performing the pre-carbonization treatment, it is easier to completely remove gases generated at an early stage of carbonization, and to suppress decomposed substances from adhering to and depositing onto the inner walls of a carbonization furnace.

When a carbonizing treatment is performed for the precursor sheet manufactured continuously, it is preferable that the entire length of precursor sheet is continuously subjected to a heat treatment from the viewpoint of manufacturing costs. When the porous electrode base materials formed is long, the productivity of the porous electrode base material increases and also subsequent membrane-electrode assembly (MEA) can also be manufactured continuously, leading to reduced production costs of fuel cells. In addition, it is preferred to roll up porous electrode base materials manufactured continuously, considering the productivity and production costs of porous electrode base materials or fuel cells.

<Step [4] for Entanglement Treatment>

By performing an entanglement treatment of the sheet-form product, a sheet having an entangled structure in which the short carbon fibers (A) are entangled three dimensionally (entangled-structure sheet) can be formed. When the precursor fibers (b) are also dispersed along with the carbon fibers (A) in the step [1] for manufacturing the sheet-form product, a sheet having an entangled-structure in which the short carbon fibers (A) and the precursor fibers (B) are three-dimensionally entangled (entangled-structure sheet) can be formed by performing an entanglement treatment of the sheet-form product.

The entanglement treatment is not limited to any specific method, and may be selected from those for forming entanglement structures as necessary. For example, mechanical entanglement methods such as needle punching, high pressure liquid jetting such as water jet punching, or high pressure gas jetting such as steam jet punching, or a combination thereof, may be used. High pressure liquid jetting is preferred since it is easier to suppress breakage of short carbon fibers (A) during entanglement treatment and to obtain an appropriate entangled structure. The method is described in detail in the following.

The high pressure liquid jetting is a method in which the sheet-form product is placed on a support member with a substantially smooth surface, and liquid column flow, liquid fan flow, liquid slit flow or the like is injected at a pressure of 1 MPa or greater to entangle the short carbon fibers (A) in the sheet-form product. When the precursor fibers (b) are also dispersed along with the short carbon fibers (A) in the step [1] for manufacturing a sheet-form product, the short carbon fibers (A) and the precursor fibers (B) are entangled. Herein, a support member with a substantially smooth surface is selected as desired so that the pattern of the support member will not be transferred onto the entangled body and the injected liquid will be removed promptly. Specific examples include a wire screen, plastic net or roll with a 30 to 200 mesh.

From the viewpoint of the productivity, it is preferable to manufacture the sheet-form products containing the short carbon fibers (A) on a support member with a substantially smooth surface, followed by performing continuously the entanglement treatment by high pressure liquid jetting or the like.

The entanglement treatment of the sheet-form product by high pressure liquid jetting may be repeated multiple times. Namely, it is possible that, after high pressure liquid jetting was performed on the sheet-form product, another sheet-form product is laminated and treated by high pressure liquid jetting. Alternatively, the sheet-form product having an entangled-structure (entangled-structure sheet-form product) may be inverted during the process and high pressure liquid jetting is performed from the opposite side. Such treatment may also be repeated.

The liquid used for high pressure liquid jetting is not limited specifically as long as it is a medium that does not dissolve the fibers to be treated. Usually, water is preferred. The water may be warm. The hole diameter of each high pressure liquid jetting nozzle is preferred to be 0.06 to 1.0 mm, more preferably 0.1 to 0.3 mm, if it makes columnar flow. The distance between jetting nozzle holes and the laminate is preferred to be 0.5 to 5 cm. The liquid pressure is preferred to be 1 MPa or greater, more preferably 1.5 MPa or greater, from the viewpoint of enough entanglement of the fibers. Entanglement treatment is performed in a single row or multiple rows. When multiple rows are employed, it is more effective to increase the pressure of high pressure liquid jetting to the second and subsequent rows rather than to the first row from the viewpoint of maintaining the shape of the sheet-form product.

When a sheet with an entangled structure is continuously manufactured, striped patterns caused by uneven fiber density in the sheets may be formed in a lengthwise direction of the sheets. However, if a high pressure liquid jetting nozzle with nozzle holes arrayed in a single row or multiple rows is oscillated in a width direction of the sheets, it is easier to suppress such striped patterns. When striped patterns are suppressed from occurring in a lengthwise direction of the sheets, the tensile strength of the sheets may be exhibited in a width direction. When using multiple high pressure liquid jetting nozzles with nozzle holes arrayed in a single row or multiple rows, periodic patterns appearing on precursor sheets with an entangled structure may be suppressed by controlling the frequency or phase differences of oscillation of high pressure liquid jetting nozzles in a width direction of the sheets.

Since the tensile strength of the sheet improves by entanglement treatment, it is not necessary to use a binder, such as polyvinyl alcohol, which is usually added in the sheet forming process. Also, the tensile strength of a sheet can be maintained in water or in a humid situation, allowing continuous addition of the phenolic resin (c) to the entangled-structure sheet. Moreover, since use of the phenolic resin (c) can eliminate the process of collecting an organic solvent, the manufacturing facility is simplified compared with conventional ones, and thus production costs can be reduced.

<Step [5] for Heating and Compression>

From the viewpoint of reducing a deviation in thickness of the porous electrode base material and suppressing short circuit or gas leak when it is installed in a fuel cell by suppressing an occurrence of fuzz of the fibers in the vicinity of the surface of the sheet, in which fuzz is generated from fibers that are in a fuzzy state on a sheet surface as caused by an entanglement treatment, the precursor sheet is preferred to be heated and compressed at the temperature of 100° C. or higher but 250° C. or lower.

When the precursor fibers (b) are dispersed along with carbon fibers (A) in the step [1] for manufacturing a sheet-form product, the step [5] for heating and compression also has an effect of fusion-bonding the short carbon fibers (A) by the precursor fibers (b).

As for the heating and compression method, any technique may be employed as long as the precursor sheet is evenly heated and compressed. For example, the precursor sheet may be heated and compressed by applying smooth steel plates to both surfaces of the precursor sheet, or using a hot-roll pressing apparatus, a continuous belt pressing apparatus or the like. When heating and compression precursor sheets manufactured continuously, a method using a hot-roll pressing or continuous-belt pressing apparatus is preferred. Accordingly, the step [3] for carbonization described above can be performed continuously.

The temperature for heating and compression is preferably 100 to 250° C., and more preferably 120 to 230° C. to effectively make a smooth surface of the precursor sheet. The duration of heating and compression can be 30 seconds to 10 minutes, for example.

The pressure for heating and compression is not limited specifically. When the ratio of the short carbon fibers (A) is low in a precursor sheet (for example, 15% by mass or greater, 50% by mass or lower), it is easier to make the surface of the precursor sheet smooth even at low pressure. The pressure for heating and compression is preferred to be 20 kPa to 10 MPa. If the pressure is 10 MPa or lower, it is easier to prevent breakage in the short carbon fibers (A) during heating and compression, and to provide an appropriate density for the porous electrode base material. If the pressure is 20 kPa or higher, the surface can be easily smoothened.

When the precursor sheet is heated and compressed by being sandwiched between two steel plates, or by using a hot-roll pressing or continuous belt pressing apparatus, it is preferred to apply a releasing agent, or to sandwich a releasing paper between the precursor sheet and the steel plate, roller or belt so that fibrous matters do not adhere to the steel plates, roller or belt.

<Step [6] for Drying Treatment>

The manufacturing method of the invention may further include the step [6] for drying the precursor sheet between the step [2] and the step [5]. Including such a step is preferred, since it is easier to reduce the energy for removing a dispersant or unreacted monomers in the step [5].

During that time, it is preferred to dry the precursor sheet at the temperature of 20 to 140° C. to remove a dispersant or unreacted monomers from the precursor sheet. The duration for drying treatment may be from 1 minute to 24 hours, for example.

The method for drying treatment is not limited specifically, and heat treatment using a hot air furnace or far-infrared furnace, or direct heating treatment using hot plates or hot rollers may be employed. To prevent the phenolic resin (c) from adhering to a heat source, it is preferred to perform dry treatment using a hot air furnace or far-infrared furnace. When drying the precursor sheet manufactured continuously, the entire length of precursor sheet is preferred to be dried continuously from the viewpoint of reducing production costs. By doing so, the step [5] for heating and compression is performed continuously after the step [6].

<Step [7] for Drying Sheet-Form Product>

The manufacturing method of the invention may include the step [7] for drying the sheet-form product between the step [1] and the step [2]. Also, when the manufacturing method of the invention includes the step [4], the step [7] for drying the sheet-form product may further be included between the step [1] and the step [4] and/or between the step [4] and the step [2]. When the drying step [7] is performed between the step [4] and the step [2], such drying treatment is conducted on the sheet-form product after entanglement treatment (entangled-structure sheet). Meanwhile, in the invention, the sheet-form product does not include a precursor sheet.

From the viewpoint of removing a dispersant from a sheet-form product subjected to a drying treatment, the sheet-form product is preferred to be dried at 20 to 140° C. in any drying step [7] described above. The duration for drying treatment is from 1 minute to 24 hours, for example.

As for the method for drying treatment, it is not limited to any specific method. However, complete dehydration using a dehydration apparatus under reduced pressure can be employed when drying the step [7] is performed between the step [1] and the step [2] or the step [1] and the step [4], for example. When drying the step [7] is performed between the step [4] and the step [2], heating treatment using a hot air furnace or far-infrared furnace, or direct heating treatment using hot plates or hot rollers may be employed. When drying the step [7] is performed between the step [4] and the step [2], drying treatment using a hot air furnace or far-infrared furnace is preferred because fibers from the entangled-structure sheet are prevented from adhering to a heat source.

Considering production costs, if sheet-form products are continuously manufactured, it is preferred to dry them continuously on the entire length of sheet-form products. By doing so, the step [7] for drying the sheet-form products can be continuously performed after the step [1] and the step [4].

<Step [8] for Water Repellent Treatment>

To a solid polymer type fuel cell, moisturized fuel is supplied to maintain suitable proton conductivity by supressing drying of a polymer electrolyte membrane. Further, as water (water vapor) is generated from the cathode side as an electrode reaction product and condensed as liquid water, which clogs the pores of the porous electrode base material and may interfere gas permeation. As such, to ensure the gas permeability, a water repellent treatment using a water repellent polymer is often carried out.

Examples of the water repellent polymer include a fluorine-based resin or a silicon resin (silicone) which is chemically stable and has high water repellency. However, as the silicone has low acid resistance, it cannot be contacted with a polymer electrolyte membrane which is strongly acidic. As such, only the fluorine-based resin is used.

Fluorine-based resin is not particularly limited, but homopolymers or copolymers of fluorine-based monomers, such as tetrafluoroethylene (TFE), hexafluoropropylene (HFP), vinylidene fluoride (VDF), chlorotrifluoroethylene (CTFE), vinyl fluoride, perfluoroalkyl vinyl ether, perfluoro (allyl vinyl ether), perfluoro(butenyl vinyl ether) (PBVE), or perfluoro(2,2-dimethyl-1,3-dioxole) (PDD), can be used. In addition, an ethylene-tetrafluoroethylene copolymer (ETFE), an ethylene-chlorotrifluoroethylene copolymer (ECTFE), and the like, which are copolymers of these fluorine-based monomers and olefins represented by ethylene, can also be used. These fluorine-based resins are preferably in a state of being dissolved in a solvent or being dispersed as a granular form in a dispersion medium, such as water or alcohol, from the viewpoint of impregnation property. Examples of those easily available as commercial products in a solution, dispersion, or granular form include polytetrafluoroethylene (PTFE), a tetrafluoroethylene-hexafluoropropylene copolymer (FEP), tetrafluoroethylene-perfluoroalkyl vinyl ether (PFA), and polyvinylidene fluoride (PVDF). These are preferably used from the viewpoint of handling properties and production cost.

As for the method for water repellent treatment of the porous electrode base material, an impregnation method (dipping method) by which the porous electrode base material is impregnated in a dispersion in which fine particles of a fluorine-based resin are dispersed and a spray method for spraying a dispersion can be used. The concentration of the fluorine-based resin dispersion is not particularly limited. However, in order to avoid clogging of the pores of the porous electrode base material and evenly adhere with the fluorine-based resin, it is preferably 1 to 30% by weight or so in terms of solid matter. It is more preferably 10 to 30% by weight, and particularly preferably 15 to 25% by weight.

When PTFE is used as a fluorine-based resin, it is preferred to calcine PTFE. The calcination temperature should be within a temperature region in which PTFE is softened and binds to the short carbon fibers (A), the carbon powder (d), or the resin carbide (C) but it does not thermally decomposed. It is more preferably 300 to 390° C., and particularly preferably 320 to 360° C.

The fluorine-based resin is applied such that it can coat from the outside the macroscopic conduction path in the porous electrode base material in which the short carbon fibers (A) and the carbon powder (d) are bound by the resin carbide (C). In other words, without interrupting the conduction path consisting of the short carbon fibers (A), the carbon powder (d), and the resin carbide (C), the fluorine-based resin is present on the surface of the conduction path. However, most of the fluorine-based resin aggregate near the cross-point among fibers, and surface of the short carbon fibers (A), the carbon powder (d), or the resin carbide (C), which constitute the porous electrode base material, is not coated with the fluorine-based resin having no gap. Thus, even after the water repellent treatment, the conduction path which extends from the surface of a base to the inside of a base is secured and both the water repellency and conductivity can be obtained.

Although the number of adding the fluorine-based resin is not particularly limited, a small addition number is preferred from the viewpoint of reducing the production cost. When the addition is made for multiple times a number of times, the slurry of the fluorine-based resin to be added may be the same, or slurries with different slurry concentration or different type of the fluorine-based resin may be used. Further, the addition amount of the fluorine-based resin may be constant in the thickness direction of the porous electrode base material or it may have a concentration gradient.

<Short Carbon Fibers (A)>

The short carbon fibers (A) as a kind of fiber constituting the porous electrode base material may be entangled in the thickness direction in the sheet-form product, the precursor sheet, and the porous electrode base material. Examples of the short carbon fibers (A) include those obtained by cutting carbon fibers, such as polyacrylonitrile-based carbon fibers (hereinafter referred to as "PAN-based carbon fibers"), pitch-based carbon fibers, and rayon-based carbon fibers, to a suitable length. Taking into consideration the mechanical strength of the porous electrode base material, PAN-based carbon fibers are preferred.

The average fiber length of the short carbon fibers (A) is preferred to be 2 to 12 mm considering dispersibility. The average diameter of the short carbon fibers (A) is preferred to be 3 to 9 µm considering production costs and dispersibility of short carbon fibers. It is more preferably 4 to 8 µm considering smoothness of the porous electrode base material. The average fiber lengths are measured using a commercially available fiber length measuring instrument (for example, HiRes-FQA (trade name), manufactured by Nomura Shoji Co., Ltd.), and an average fiber diameter is measured using a commercially available fiber diameter measuring instrument (for example, FDAS 765 (trade name), manufactured by Dia-Stron Ltd.).

<Precursor Fibers (b)>

As described above, the carbon fiber precursor short fibers (b1) and/or the fibrillar fibers (b2) are used as the precursor fibers (b) in the invention.

(Carbon Fiber Precursor Short Fibers (b1))

The carbon fiber precursor short fibers (b1) may be formed by cutting carbon fiber precursor long fibers into appropriate lengths. Carbon fiber precursor fibers in long fiber form may be made from the later-described polymers (acrylic polymers, for example).

The average fiber length of the carbon fiber precursor short fibers (b1) is preferred to be 2 to 20 mm from the viewpoint of dispersibility. The cross-sectional shape of the carbon fiber precursor short fibers (b1) is not limited specifically, but a shape closer to a perfect circle is preferred considering production costs and mechanical strength after carbonization. In addition, the average fiber diameter of the carbon fiber precursor short fibers (b1) is preferred to be 5 µm or less to easily suppress breakage due to contraction during the heating and compression step [5] and the carbonization step [3]. Also, considering spinnability, the average fiber diameter of the carbon fiber precursor short fibers (b1) is preferred to be 1 µm or greater.

Regarding the polymer for constituting the carbon fiber precursor short fibers (b1), the remaining mass after the carbonization step is preferred to be 20% by mass or greater to maintain the sheet shape after carbonization. Examples of the polymers include acrylic polymers, cellulose-based polymers and phenolic polymers.

Acrylic polymers used for the carbon fiber precursor short fibers (b1) may be homopolymers of acrylonitrile or copolymers of acrylonitrile and another monomer. As for monomers to be copolymerized with acrylonitrile, they are not limited specifically as long as they are unsaturated monomers constituting general acrylic fibers; for example, acrylic acid esters represented by methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters represented by methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, and diethylaminoethyl methacrylate; acrylic acid, methacrylic acid, maleic acid, itaconic acid, acrylamide, N-methylol acrylamide, diacetone acrylamide, styrene, vinyl toluene, vinyl acetate, vinyl chloride, vinylidene chloride, vinylidene bromide, vinyl fluoride, and vinylidene fluoride.

Considering spinnability, capability of binding the short carbon fibers (A) in a range of low to high temperatures, a greater remaining mass amount in the carbonization treatment, and fiber elasticity and fiber strength during the entanglement treatment described above, it is preferred to use acrylic polymers containing 50% by mass or greater of acrylonitrile units.

The weight average molecular weight of an acrylonitrile-based polymer used for the short carbon precursor (b1) is not limited specifically, but it is preferred to be 50,000 to 1,000,000. When the weight average molecular weight is 50,000 or more, fiber spinnability is enhanced, and the yarn quality of fibers tends to be better. When the weight average molecular weight is 1,000,000 or less, the polymer density providing an optimum viscosity for a spinning stock solution is higher, and thus the productivity tends to improve.

As for the carbon fiber precursor short fibers (b1), it is possible to use one type, or to use two or more types of the carbon fiber precursor short fibers (b1) with different fiber diameters and containing different polymers. Depending on the type of the carbon fiber precursor short fibers (b1) or the later-described fibrillar fibers (b2), and on the ratio to be combined with the short carbon fibers (A), the remaining amount of the carbon fibers (B) derived from the precursor fibers (b) can be adjusted in a porous electrode precursor obtained in the end. When the precursor fibers (b) is used for forming a sheet-form product, the ratio for combining the short carbon fibers (A) and the precursor fibers (b) is preferred to be determined such that the short carbon fibers (A) and the precursor fibers (B) after carbonization in a porous electrode base material have the following ratios. With respect to the sum of the short carbon fibers (A) and the carbon fibers (B), the amount of the carbon fibers (B) in a porous electrode base material is preferred to be 1% by mass or greater, from the viewpoint of the binding effect on the short carbon fibers (A); and 50% by mass or lower, from the viewpoint of the mechanical strength of the porous electrode base material. To make it easier to obtain a porous electrode base material having appropriate mechanical strength and through-plane resistance, the amount of the carbon fibers (B) in the porous electrode base material is more preferred to be 4 to 25% by mass with respect to the sum of the short carbon fibers (A) and the carbon fibers (B).

(Fibrillar Fibers (b2))

The fibrillar fibers (b2) are dispersed with the short carbon fibers (A) and prevent the short carbon fibers (A) from converging again, while setting a sheet-form product to be an independent sheet. Also, depending on the resin to be used (phenolic resin (c), for example), condensation water may be produced when the resin cures. It is also expected that fibrillar fibers can absorb and discharge such water. Thus, it is preferred to use a resin with hydrophilic properties. Examples of the specific fibrillar fibers (b2) include synthetic pulp such as fibrillar polyethylene fibers, acrylic fibers and aramid fibers. The fibrillar fibers (b2) may be those having residual carbon (remain as carbon) after carbonization treatment, or those not having residual carbon (do not remain as carbon) after carbonization treatment.

Further, the fibrillar fibers (b2) may be the carbon fiber precursor fibers (b2-1) which have a structure in which numerous fibrils with a diameter of a few μm or less (0.1 to 3 μm, for example) branch out from fibrous stems, or the carbon fiber precursor short fibers (b2-2) which are fibrillated by beating splittable sea-island composite fibers. When such fibrillar carbon fiber precursor fibers are used, the short carbon fibers (A) and the fibrillar fibers (b2) entangle well in a precursor sheet, thereby making it easier to obtain a precursor sheet with excellent mechanical strength. The freeness of the fibrillar fibers (b2) is not limited specifically. Generally, when fibrillar fibers with lower freeness are used, the mechanical strength of a precursor sheet tends to improve but gas permeability of the porous electrode base material tends to decrease. In the following, there is a case in which the above two types of fibrillar fibers (b2) may be referred to as the fibers (b2-1) and the fibers (b2-2), respectively.

As for the fibrillar fibers (b2), it is possible to use one type of the fibers (b2-1), or two or more types of the fibers (b2-1) with different freeness degrees and fiber diameters or containing different polymers. Also, the fibrillar fibers (b2) may be used in the form of one type of the fibers (b2-2), or two or more types of the fibers (b2-2) with different freeness degrees and fiber diameters or containing different polymers, or any combination of the above can be also used.

A detailed description of those two fibrillar fibers (b2) is provided below.

Precursor Carbon Fibers (b2-1) with a Structure of Numerous Branched Fibrils

Regarding the polymer constituting the fibers (b2-1), the remaining mass amount in the carbonization step is preferred to be 20% by mass or greater from the viewpoint of forming a structure of a porous electrode base material together with the short carbon fibers (A) after carbonization. Examples of such polymers include acrylic polymers, cellulose-based polymers and phenolic polymers.

The acrylic polymers used for the fibers (b2-1) may be the same acrylic polymers used for the carbon fiber precursor short fibers (b1) described above. Among those, acrylic polymers containing 50% by mass or greater of acrylonitrile units are preferred, considering spinnability, capability of binding the short carbon fibers (A) in a temperature range from low to high, a greater remaining mass amount in heating and compression and carbonization treatments, entanglement with the short carbon fibers (A), and sheet strength.

The method for manufacturing the fibers (b2-1) is not limited specifically, but an injection-coagulation method is preferred since it is easier to control freeness.

The average fiber length of the fibers (b2-1) is preferred to be 0.1 mm or greater considering maintenance of the mechanical strength of a porous electrode base material, and 3 mm or less considering dispersibility in a precursor sheet. Also, the diameter (average fiber diameter) of the fibers (b2-1) is preferred to be 0.01 μm or greater, from the viewpoint of ensuring the dehydration property when manufacturing a precursor sheet or gas permeability of the porous electrode base material, and 30 μm or smaller considering suppression of breakage caused by contraction during heat treatment.

Carbon Precursor Short Fibers (b2-2) Fibrillated Through Refining

The fibers (b2-2) may be long splittable sea-island composite fibers cut into appropriate lengths and fibrillated by beating using a refiner or pulper. The splittable sea-island composite fibers are fibrillated by beating. The long splittable sea-island composite fibers can be produced by using two or more types of polymers which dissolve in a common solvent but are incompatible with each other. At that time, at least one of the polymers is preferred to have a remaining amount of 20% by mass or greater in a carbonization the step from the viewpoint of having the structure of the porous electrode base material together with the short carbon fibers (A) after carbonization.

Among the polymers used in the splittable sea-island composite fibers, acrylic polymers, cellulose-based polymers and phenolic polymers, for example, can be mentioned as those having a remaining amount of 20% by mass or greater in the carbonization step.

Acrylic polymers used for the splittable sea-island composite fibers may be the same acrylic polymers used for the carbon fiber precursor short fibers (b1) described above. Among those, acrylic polymers containing 50% by mass or greater of acrylonitrile units are preferably used from the viewpoint of spinnability and the remaining mass amount in the carbonization treatment step.

The weight average molecular weight of an acrylonitrile-based polymer used for splittable sea-island composite fibers is not limited specifically, but it is preferred to be 50,000 to 1,000,000. When the weight average molecular weight is 50,000 or more, spinnability improves, and the yarn quality of fibers tends to be better. When the weight average molecular weight is 1,000,000 or less, the polymer density providing an optimum viscosity for a spinning stock solution is higher, and thus the productivity tends to improve.

Regarding a splittable sea-island composite fiber, when an acrylic polymer described above is used for one of the polymers whose remaining mass amount is 20% by mass or greater in the step for carbonization treatment [3], another polymer is required to be dissolved in a common solvent with the acrylic polymer and to stay stable in a spinning stock solution. Namely, the other polymer is required to be incompatible with the acrylonitrile-based polymer when dissolved in a common solvent with the acrylonitrile-based polymer, but to have compatibility to such a degree that it can form a sea-island structure in a spinning the step. Accordingly, it is easier to prevent uneven distribution of fibers in a spinning stock solution, which may occur when the degree of incompatibility is greater between two types of polymers, while preventing thread breakage in a spinning the step. It is also easier to form fibers. Moreover, to prevent the other polymer from dissolving and falling into a coagulation tank and cleansing tank during wet spinning, the other polymer is required to be hardly soluble in water.

As for the other polymer that satisfies the above requirements, the following, for example, may be listed: polyvinyl chloride, polyvinylidene chloride, polyvinylidene fluoride, polyvinylpyrrolidone, cellulose acetate, an acrylic resin, a methacrylic resin, a phenolic resin and the like. Among those, cellulose acetate, an acrylic resin, and a methacrylic resin are preferable in terms of balancing the above requirements. The other polymer may be one type or a combination of two or more types of polymers.

Splittable sea-island composite fibers used for the fibers (b2-2) may be produced using a regular wet spinning method. When one of the polymers is an acrylonitrile-based polymer whose remaining mass amount is 20% by mass or greater in the step [3], splittable sea-island composite fibers can be produced by the following method. First, the acrylonitrile-based polymer and the other polymer are mixed and then dissolved in a solvent to form a spinning stock solution of splittable sea-island composite fibers. Alternatively, a spinning stock solution obtained by dissolving an acrylonitrile-based polymer in a solvent and another spinning stock solution obtained by dissolving the other polymer in a solvent may be mixed by a static mixer or the like to give a spinning stock solution of splittable sea-island composite fibers. An organic solvent such as dimethylamide, dimethyl formamide, dimethyl sulfoxide or the like can be used for the solvent. Splittable sea-island composite fibers can be obtained by spinning those spinning stock solutions through a nozzle, and conducting hot wet stretching, cleansing, drying, and hot dry stretching.

The cross-sectional shape of splittable sea-island composite fibers is not limited specifically. To enhance dispersibility and to suppress breakage caused by contraction in the heat treatment, the fineness of splittable sea-island composite fibers is preferred to be 1 to 10 dtex. The average fiber length of splittable sea-island composite fibers is preferred to be 1 to 20 mm from the viewpoint of dispersibility.

The splittable sea-island composite fibers are beaten as a result of interfacial peeling which is caused by external mechanical force, and at least some of the fibers are split to become fibrillated. A beating method is not limited to any specific method; for example, a refiner, pulper, beater, or high pressure water jetting (water jet punching) may be used to fibrillate fibers.

When the splittable sea-island composite fibers are beaten through interfacial peeling caused by external mechanical force, the fibrillated state may vary depending on the method and duration of beating. The degree of fibrillation can be evaluated based on its freeness. The freeness is obtained according to P8121 (pulp freeness testing: Canadian standard) using a Canadian Standard Freeness (CSF) tester. First, 3 grams of completely dried beaten fibers are prepared and dispersed in 1000 mL of water. The dispersion is put into a freeness cylinder of a CSF tester, the upper cover is closed, and the air cock is closed. Next, the lower cover is opened and a measuring cylinder is positioned at the side pipe of the CSF tester, the air cock is opened and the dispersion is discharged. The amount of discharged water in the measuring cylinder is measured and recorded. Testing is conducted twice or more, and is repeated until the difference with the average value is within 2%. The freeness of splittable sea-island composite fibers is not limited specifically; however, the smaller the freeness, the more likely it is that the carbon fibers (B) with a three-dimensional cross-linked structure are formed. When splittable sea-island composite fibers having high freeness are used directly without conducting sufficient beating, the carbon fibers (B) with a fiber structure are more likely to be formed.

The average fiber length of the fibers (b2-2) is preferred to be 1 mm or greater considering maintenance of the mechanical strength of a precursor sheet, and more preferably 20 mm or less considering dispersibility. Also, the average fiber diameter of the fibers (b2-2) is preferred to be 1 μm or greater considering enhancement of dispersibility, and preferably 50 μm or less considering suppression of breakage caused by contraction during the heat treatment. Moreover, the average fiber diameter of fibrillated portions of the fibers (b2-2) is preferred to be 0.01 μm or greater considering dehydration property when forming a precursor sheet or maintenance of gas permeability of a porous electrode base material. It is also preferred to be 30 μm or less considering enhancement of the dispersibility.

<Carbon Fibers (B)>

The carbon fibers (B) are carbon fibers that are obtained by the carbonizing treatment, among the carbon fiber precursor short fibers (b1) and the fibrillar fibers (b2), those having residual carbon (remain as carbon). The carbon fiber precursor short fibers (b1) can be those obtained by cutting long fibrillar carbon fiber precursor fibers to a suitable length.

The average fiber diameter of the carbon fibers (B) is preferably 5 μm or less from the viewpoint of forming pores that are suitable for gas permeability or moisture management (moisturizing property or water draining property). Further, from the viewpoint of mechanical strength, the average fiber diameter of the carbon fibers (B) is preferably 0.1 μm or more. More preferably, it is 0.5 μm to 3 μm.

<Phenolic Resin (c)>

As described above, one or both of a water soluble phenolic resin and/or a water dispersible phenolic resin are used as the phenolic resin (c) in the invention.

(Water Dispersible Phenolic Resin)

As for the water dispersible phenolic resins used in the invention, for example, an emulsified solution (emulsion) or a suspension solution (suspension) of the phenolic resins described in JP 2004-307815 A, JP 2006-56960 A, and the like, or well-known water dispersible phenolic resins which is also referred to as an aqueous dispersion can be used. Meanwhile, a resol type phenolic resin before cross-linking is mostly present as liquid within a temperature and pressure range in which water is present as liquid, and thus the aqueous dispersion is often present as an emulsified solution (emulsion). Meanwhile, a Novolac type phenolic resin generally has a higher molecular weight compared to a resol type phenolic resin and is mostly present as solid within a temperature and pressure range in which water is present as liquid, and thus the aqueous dispersion is often present as a suspension solution (suspension). In any cases of an emulsified solution and a suspension solution, the average particle diameter of the phenolic resin is preferably 10 μm or less, and more preferably 5 μm or less from the viewpoint of infiltrating into an inner layer of the sheet-form product. For example, if phenolic resin powder, which is obtained by crushing after bulk polymerization and not intended to be dispersed in water, is dispersed in water by force, it is not expected to have quantitative infiltration into an inner layer of the sheet-form product, and therefore undesirable. Specific examples thereof include trade names: Phenolite TD-4304 and PE-602, manufactured by DIC Corporation, trade names: Sumilite Resin PR-14170, PR-55464 and PR-50607B, manufactured by Sumitomo Bakelite Co., Ltd., trade name Shonol BRE-174, manufactured by Showa Denko K.K., or the like. The water dispersible phenolic resin tends to easily bind to the short carbon fibers (A) and remain as a conductive substance when it is carbonized, the same as regular phenolic resins that use methanol, methyl ethyl ketone or the like as a solvent.

With regard to the form of obtainable water dispersible phenolic resins, it is preferred to use commercially available aqueous dispersion types or granular types from the viewpoint of handling and production costs. By using commercially available water dispersible phenolic resins, residues of organic solvents or unreacted monomers that remain during the production process are less than those of regular phenolic resins. Namely, since amounts of organic solvents or unreacted monomers that volatilize during drying or heating and compression treatment are small, the production cost can be saved as discharge facilities or the like are simplified.

(Water Soluble Phenolic Resin)

Water soluble phenolic resins used in the invention are, for example, well-known water soluble phenolic resins such as resol type phenolic resins with excellent solubility described in JP 2009-84382 A, for example; more specifically, trade name Resitop PL-5634, manufactured by Gun Ei Chemical Industry Co., Ltd., trade names Sumilite Resin PR-50781, PR-9800D and PR-55386, manufactured by Sumitomo Bakelite Co., Ltd., trade name Shonole BRL-1583 and BRL-120Z, manufactured by Showa Denko K.K., or the like. The water soluble phenolic resin easily binds to the short carbon fibers (A) and easily remains as a conductive substance when it is carbonized, the same as regular phenolic resins that use methanol or methyl ethyl ketone as a solvent.

With regard to the form of obtainable water soluble phenolic resins, it is preferred to use commercially available aqueous solution types from the viewpoint of handling and production costs. By using commercially available water soluble phenolic resins, residues of organic solvents or unreacted monomers that remain during the production process are less than those of regular phenolic resins. Namely, since amounts of organic solvents or unreacted monomers that volatilize during drying or heating and compression treatment are small, the production cost can be saved as discharge facilities or the like are simplified.

The phenolic resin (c) used in the above-described step [2] for adding resin is preferred to be a dispersion (emulsified solution or suspension solution) or aqueous solution type from the viewpoint of infiltration into a sheet. The solid matter concentration of the phenolic resin (c) in a dispersion or an aqueous solution is preferred to be 1% by mass or greater for exhibition of the strength and conductivity of the porous electrode base material, and 40% by mass or less to make a low-viscosity dispersion with a high infiltration property. It is more preferably 5 to 35% by mass.

As a medium to dilute or disperse the obtained the phenolic resin (c), water, alcohol or a combination thereof is preferred considering handling and production costs. In addition, it is more preferred to consist primarily of water considering production costs, atmospheric environmental protection and human environmental protection.

<Resin Carbide (C)>

In the invention, the resin carbide (C) indicates an amorphous substance that is obtained by carbonization of a carbon precursor resin, which binds, either by itself or with the resin carbide (C) and the carbon fibers (B), the short carbon fibers (A) to each other or with the carbon powder (d).

As for the carbon precursor resin, those having high binding property to carbon fibers such as phenolic resin and high residual mass at the time of carbonization are preferable, but the carbon precursor resin is not specifically limited thereto.

Depending on the type of the carbon precursor resin or impregnation amount in a carbon fiber paper, a ratio of the resin carbide (C) finally remained as a carbide in a porous carbon electrode base material varies. When the porous electrode base material is 100% by mass, the resin carbide (C) is preferably 5 to 25% by mass therein. More preferred lower limit and upper limit are 10% by mass and 20% by mass, respectively.

In the resin carbide (C), the resin carbide (C) derived from at least one selected from a group consisting of a water soluble phenolic resin and a water dispersible phenolic resin is included.

<Carbon Powder (d)>

As for the carbon powder (d), using graphite powder, carbon black, milled fiber, or a mixture thereof is preferable from the viewpoint of exhibiting conductivity.

Graphite powder is composed of a highly crystalline graphite structure and the average particle diameter of its primary particles is generally several micrometers to several hundred micrometers. When an addition solution containing graphite powder mixed with the resin (c) in liquid phase is added to the sheet-form product, the resin (c) penetrates in the thickness direction of the sheet-form product and infiltrates to its backside. However, having a large size, graphite powder hardly infiltrates in the thickness direction so that it may be localized in the vicinity of the surface layer. Examples of the graphite powder which can be used include pyrolytic graphite, spherical graphite, flake graphite, chunky graphite, earthy graphite, artificial graphite, expanded graphite, or the like. However, from the viewpoint of exhibiting conductivity, pyrolytic graphite, spherical graphite, or flake graphite is preferable.

Carbon black is generally present as structures (agglomerates) in which primary particles having an average particle diameter of several tens of nanometers are joined together by melting to form structures, and further, the structures are joined together by Van der Waals force. Carbon black has a significantly larger number of particles per unit mass than graphite powder, and at a certain critical concentration or more, the agglomerates are connected like a three-dimensional network to form macroscopic conductive paths. Thus, the addition solution containing carbon black mixed at critical concentration or more with the resin (c) in liquid phase is added to the sheet-form product, the resin (c) penetrates in the thickness direction of the sheet-form product and infiltrates to its backside. However, carbon black hardly infiltrates in the thickness direction so that it can be localized in the vicinity of the surface layer. Furnace black, channel black, acetylene black, lamp black, thermal black, ketjen black, or the like can be used as the carbon black. Acetylene black or ketjen black having excellent electrical conductivity is more preferred.

As for the milled fiber, those produced by crushing virgin carbon fibers can be used or those produced from recycled product such as a molded article of carbon fiber-reinforced thermosetting resin, a molded article of carbon fiber-reinforced thermoplastic resin, or a prepreg can be also used.

Furthermore, from the viewpoint of infiltration property to the sheet-form product which consists of the short carbon fibers (A) and at least one selected from a group consisting of one or more types of oxidized fiber precursor short fibers (b) and one or more types of fibrillar oxidized fiber precursor fibers (b') that are described below, the phenolic resin (c) and the carbon powder (d) are preferably in a slurry phase. As for the dispersion solvent, from the viewpoint of handling property and production cost, it is preferable to use water, alcohol, dimethyl formamide, dimethyl acetamide, or a mixture thereof. When water is used as the dispersion medium, a dispersant like surfactant may be used for dispersing the phenolic resin (c) or the carbon powder (d). Examples of the dispersant which can be used include polyethers such as polyoxyethylene alkylphenyl ether and aromatic sulfonates such as naphthalene sulfonate. A dispersant containing a metal ion such as sodium may damage the furnace as it remains in the precursor sheet and gets scattered in the furnace during the following carbonation step, and thus its use is preferably avoided.

The mass ratio of the carbon powder (d) relative to the solid matter of the phenolic resin (c) varies depending on particle size distribution or viscosity of the phenolic resin (c) or particle size distribution, volume size, or easiness of agglomeration of the carbon powder (d). However, from the viewpoint of exhibiting conductivity or handling property, it is preferably 0.001 to 3.0, more preferably 0.01 to 2.0, and particularly preferably 0.1 to 1.0. When the ratio is excessively low, sufficient conductivity is not obtained or carbon powder is not localized on the surface as it penetrates through the backside. On the other hand, when the ratio is excessively high, the viscosity of the dispersion (e) is excessively high even with a combination of the phenolic resin (c) and the carbon powder (d) so that components of the phenolic resin (c) also cannot penetrate the sheet-form product.

The average particle diameter of the substantial particles or agglomerate of the carbon powder (d) is, from the viewpoint of holding and having surface localization of the sheet-form product which consists of the short carbon fibers (A) and at least one selected from a group of the precursor fibers (b), preferably 0.1 to 50 µm or so, and more preferably 1 to 20 µm. The aforementioned "substantial particles" indicate particles that are stably present in the dispersion (e) of the resin (c) and the carbon powder (d) under an environment which is free from strong shearing to disrupt the agglomerate. In the case of graphite powder or miller fiber, it corresponds to the primary particles. In the case of carbon black, it corresponds to structures or agglomerates in which the primary particles are agglomerated.

<<Porous Electrode Base Material>>

The porous electrode base materials may have a shape like a flat sheet, a whirlpool, or the like. The weight of the sheet-type porous electrode base material per unit area is preferred to be 15 g/m² or more but 100 g/m² or less considering handling property. The porosity of a sheet-type porous electrode base material is preferred to be 50% or greater considering gas diffusion property, but 90% or less considering its mechanical strength. The thickness of the sheet-type porous electrode base material is preferred to be 50 µm or greater but 300 µm or less considering handling property. In addition, the undulation of the sheet-type porous electrode base material is preferably 5 mm or less from the viewpoint of performing uniform post treatments such as water repellent treatment.

The gas permeability of the porous electrode base material is preferably 10 mL/hr/cm²/Pa or greater considering gas diffusion property, and also preferably 3000 mL/hr/cm²/Pa or less from the viewpoint of preventing drying of the electrolyte membrane. In addition, electrical resistance in a thickness direction (through-plane resistance) of the porous electrode base material is preferred to be 50 mΩ·cm² or less from the viewpoint of collecting efficiently electrons that are generated at electrode catalysts. Methods for measuring gas permeability and through-plane resistance of the porous electrode substance are described later in Examples.

Meanwhile, the following <1> to <6> can be preferably exemplified.

<1> A porous electrode base material with a sheet-form structure having the short carbon fibers (A) bound by the resin carbide (C) derived from at least one phenolic resin (c) selected from a group consisting of a water soluble phenolic resin and a water dispersible phenolic resin, in which the carbon powder (d) is localized in the vicinity of the surface layer of a single side or both sides of the structure.

<2> A porous electrode base material with a sheet-form structure having the short carbon fibers (A) bound by the resin carbide (C), in which a region having the short carbon fibers (A) and carbon powder (d) bound by the resin carbide (C) is localized in the vicinity of the surface layer of a single side or both sides of the structure.

<3> A porous electrode base material with a sheet-form structure having the short carbon fibers (A) bound by the resin carbide (C), in which a region having the short carbon fibers (A) and carbon powder (d) bound by the resin carbide (C) is included in the vicinity of the surface layer of a single side or both sides of the structure, the pore occupancy in the region X from the surface of a plane having the aforementioned region to the depth of 20 µm is less than 30%, and the pore occupancy in the region Y from the center of the sheet-form structure to the depth of 40 µm in the thickness direction is 50 to 90%.

<4> A porous electrode base material with a sheet-form structure having the short carbon fibers (A) bound by the carbon fibers (B) with a fiber diameter of 0.1 to 5 µm and the resin carbide (C) derived from at least one phenolic resin (c) selected from a group consisting of a water soluble phenolic resin and a water dispersible phenolic resin, in which the short carbon fibers (A) form a three-dimensional entanglement structure in the structure and the carbon powder (d) is localized in the vicinity of the surface layer of a single side or both sides of the structure.

<5> A porous electrode base material with a sheet-form structure having the short carbon fibers (A) bound by the carbon fibers (B) with a fiber diameter of 0.1 to 5 µm and the resin carbide (C), in which the short carbon fibers (A) form a three-dimensional entanglement structure in the structure and a region having the short carbon fibers (A) and the carbon powder (d) bound by the resin carbide (C) is localized in the vicinity of the surface layer of a single side or both sides of the structure.

<6> A porous electrode base material with a sheet-form structure having the short carbon fibers (A) bound by the carbon fibers (B) with a fiber diameter of 0.1 to 5 µm and the resin carbide (C), in which the short carbon fibers (A) form a three-dimensional entanglement structure in the structure, a region having the short carbon fibers (A) and the carbon powder (d) bound by the resin carbide (C) is included in the vicinity of the surface layer of a single side or both sides of the structure, the pore occupancy in the region X from the surface of a plane having the aforementioned region to the depth of 20 µm is less than 30%, and the pore occupancy in the region Y from the center of the structure to the depth of 40 µm in the thickness direction is 50 to 90%.

In the above-described <1> and <4>, the expression "the carbon powder (d) is localized in the vicinity of the surface layer of a single side or both sides of the sheet-form structure" means that, compared to the inside (inner layer) of the porous electrode base material, the carbon powder (d) is present more on a surface, or on a surface and in the vicinity of a surface layer of the porous electrode base material. Meanwhile, the "surface" indicates a surface which can be observed without performing a special processing like cutting or polishing. Meanwhile, "in the vicinity of the surface layer" indicates a region with a certain width in the thickness direction, including the surface. Specifically, (i) when the cross section of the porous electrode base material is observed, pores in the vicinity of the surface layer are filled with the carbon powder (d) so that the pore occupancy is relatively low, and thus it is difficult to identify each fiber. On the other hand, the pore occupancy is relatively high in the inner layer, and thus it has a state which allows easy identification of each fiber. Further, it is preferable to have (ii) a state in which, when observation is made from the surface of the porous electrode base material, the vicinity of the surface layer exhibits almost no fibers or pores other than the outermost surface when observing the surface as the surface of the porous electrode base material is coated with a mixture of the resin carbide (C) and the carbon powder (d).

The "pore occupancy in the vicinity of the surface layer is relatively low, and thus it is difficult to identify each fiber, but the pore occupancy is relatively high in the inner layer, and thus it has a state which allows easy identification of each fiber" in the above (i) can be determined from a photographic image for observing cross section. Further, with regard to the "pores in the vicinity of the surface layer are filled with the carbon powder (d) so that the pore occupancy is relatively low, and thus it is difficult to identify each fiber, but the pore occupancy is relatively high in the inner layer, and thus it has a state which allows easy identification of each fiber", it is more specifically as follows: when the region from the outermost layer of the porous electrode base material to the depth of 20 μm is X and the region from the center of the porous electrode base material to the depth of 40 μm in the thickness direction is Y, it is preferable that the pore occupancy in the region X be less than 30% and the pore occupancy in the region Y be 50 to 90%, and it is more preferable that the pore occupancy in the region X be less than 25% and the pore occupancy in the region Y be 60 to 80%. Meanwhile, the "pore occupancy" indicates the value that is obtained by the calculation method to be described below.

For obtaining a cross section of the porous electrode base material, it is preferable to use a cross section polisher (CP) based on ion etching or focused ion beam (FIB) device as common mechanical polishing may easily cause polishing dent or flowing on an interface at which materials are bonded. As for the observation of the cross section or surface of the porous electrode base material, it is not particularly limited if it is a method allowing easy identification of fibers or particles. However, a scanning electron microscope having a high depth of field is preferably used. The magnification ratio for observing the cross section is the magnification ratio for covering the whole at least in the thickness direction (that is, a single photographic image contains from a surface layer at one side to a surface layer at the other side). Specifically, the magnification ratio is 200 times to 500 times or so. Further, for calculating the porosity from the observed photographic image, an image analysis software for binarization of gray scale image to fractionate a pore part and the remaining part and area calculation of each part is preferably used.

The "state in which no fibers or pores are shown other than the outermost surface" as described in the above (ii) indicates that, in the photographic image for observing the surface of the porous electrode base material, the area of occupancy by the mixture of the resin carbide (C) and the carbon powder (d) is larger than the area of occupancy by fibers or pores other than the outermost surface. At that time, fibers or pores from other than the outermost surface may be partially seen. When expressed with number, the area of occupancy by the mixture of the resin carbide (C) and the carbon powder (d) is preferably 50% or more, more preferably 70% or more, and particularly preferably 90% or more of the total in a photographic image for surface observation.

Further, "a region having the short carbon fibers (A) and the carbon powder (d) bound by the resin carbide (C) is localized in the vicinity of the surface layer of a single side or both sides of the structure" described in the above <2> and <5> indicates, in addition to the aforementioned (i) and (ii), (iii) a state in which the shape of the particles derived from the carbon powder (d) can be identified from a photographic image for observing the surface of the porous electrode base material.

Since being produced by the manufacturing method described above, the porous electrode base material of the invention has following characteristics.

<Bulk Density>

In the invention, the bulk density of the porous electrode base material is calculated as follows from the weight of the porous electrode base material per unit area and the initial thickness of the porous electrode base material to be described later in detail.

Bulk density $(g/cm^3)$=Weight per unit area $(g/m^2)$/ Initial thickness (μm)

If the bulk density is 0.20 $g/cm^3$ or greater, a porous electrode base material is formed, which is low in through-plane resistance as being easy to handle. If the bulk density is 0.45 $g/cm^3$ or less, a porous electrode base material with excellent gas permeability is obtained. Also, considering mechanical strength and cushion characteristics, the bulk density is preferred to be 0.25 $g/cm^3$ or greater but 0.45 $g/cm^3$ or less.

<Three-dimensional Entangled Structure>

In the invention, whether or not the short carbon fibers (A) form a three-dimensional entangled structure is determined by observing a cross section of a sheet-form product as a measurement subject (porous electrode base material) and by measuring the angle between the short carbon fibers (A) and a sheet surface at the cross section. The cross section to be observed is positioned perpendicular to a sheet surface of the sheet-form product as a measurement subject.

Figure 2:
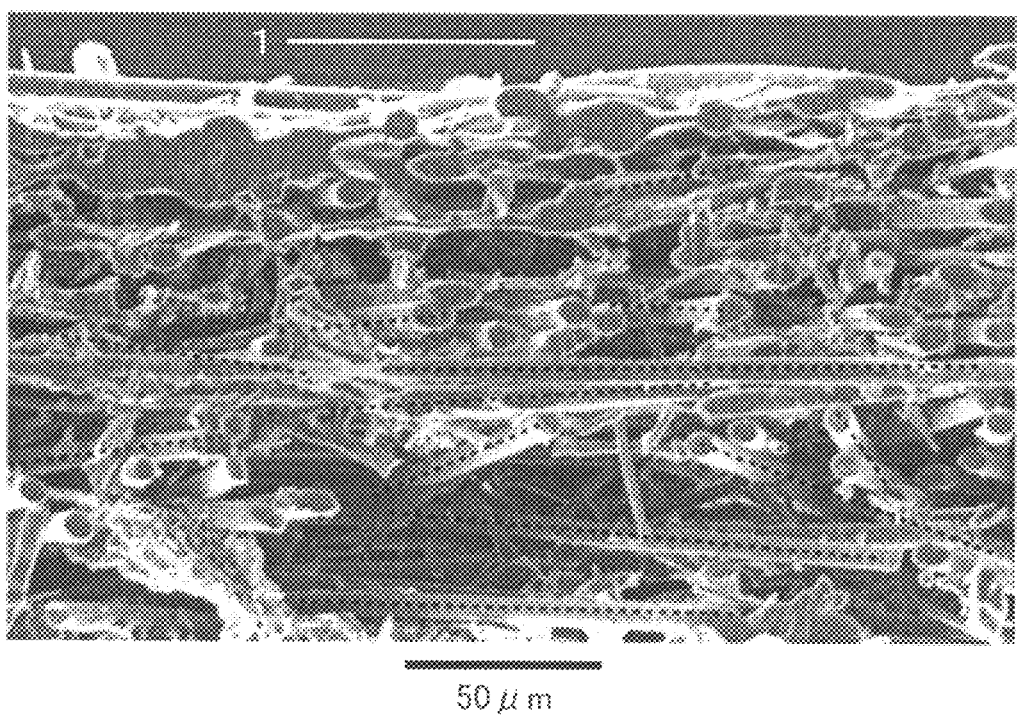
FIG. 2 is a drawing illustrating an example of a scanning electron microscopic image of the cross section of the porous electrode base material of the invention, which is given also for describing a method for measuring an angle between short carbon fibers and a horizontal plane.
Figure 3:
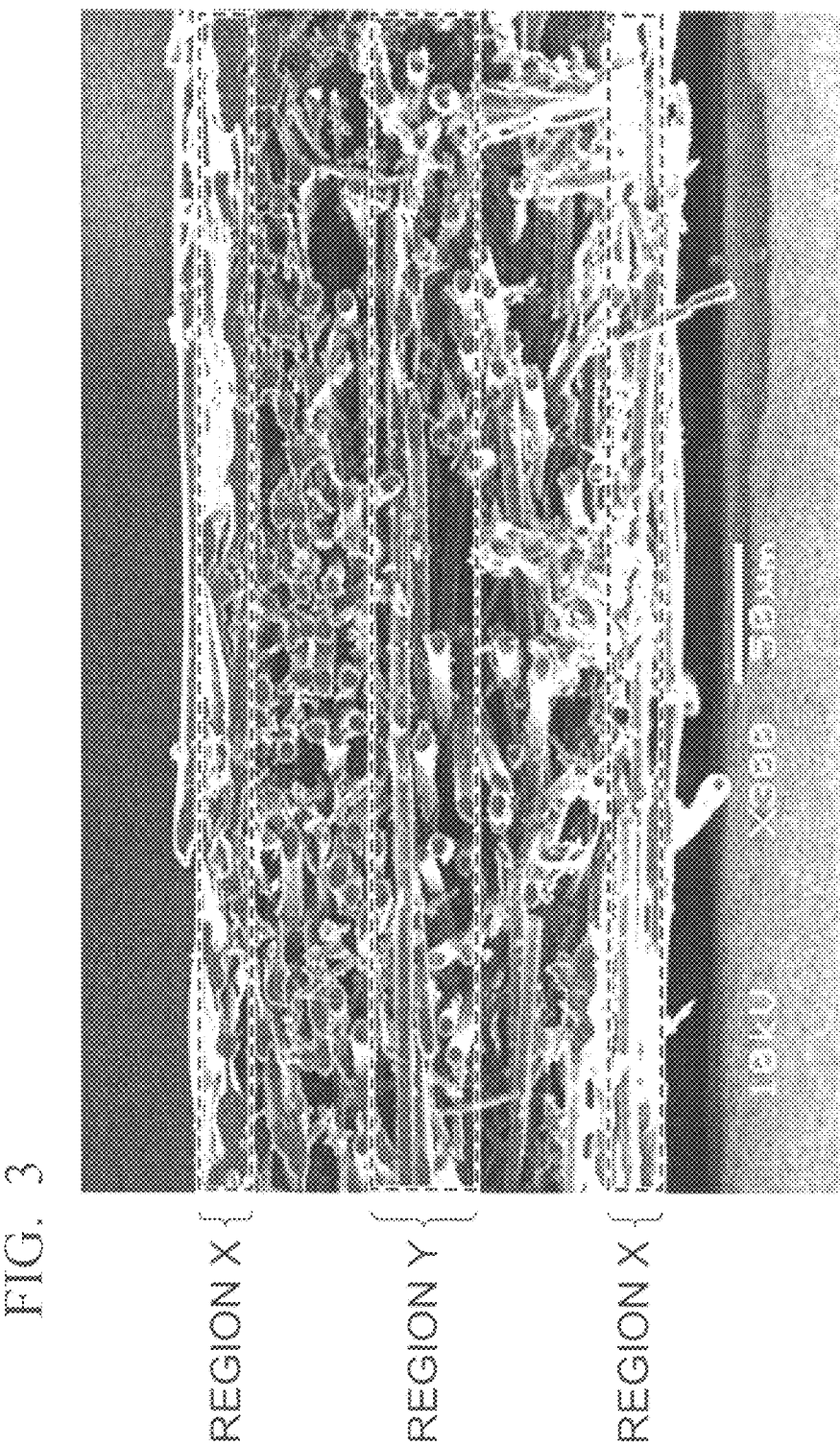
FIG. 3 is a drawing illustrating an example of a scanning electron microscopic image of the cross section of the porous electrode base material of the invention, which is given also for describing the localization of carbon powder in the vicinity of the surface layer.
Figure 4:
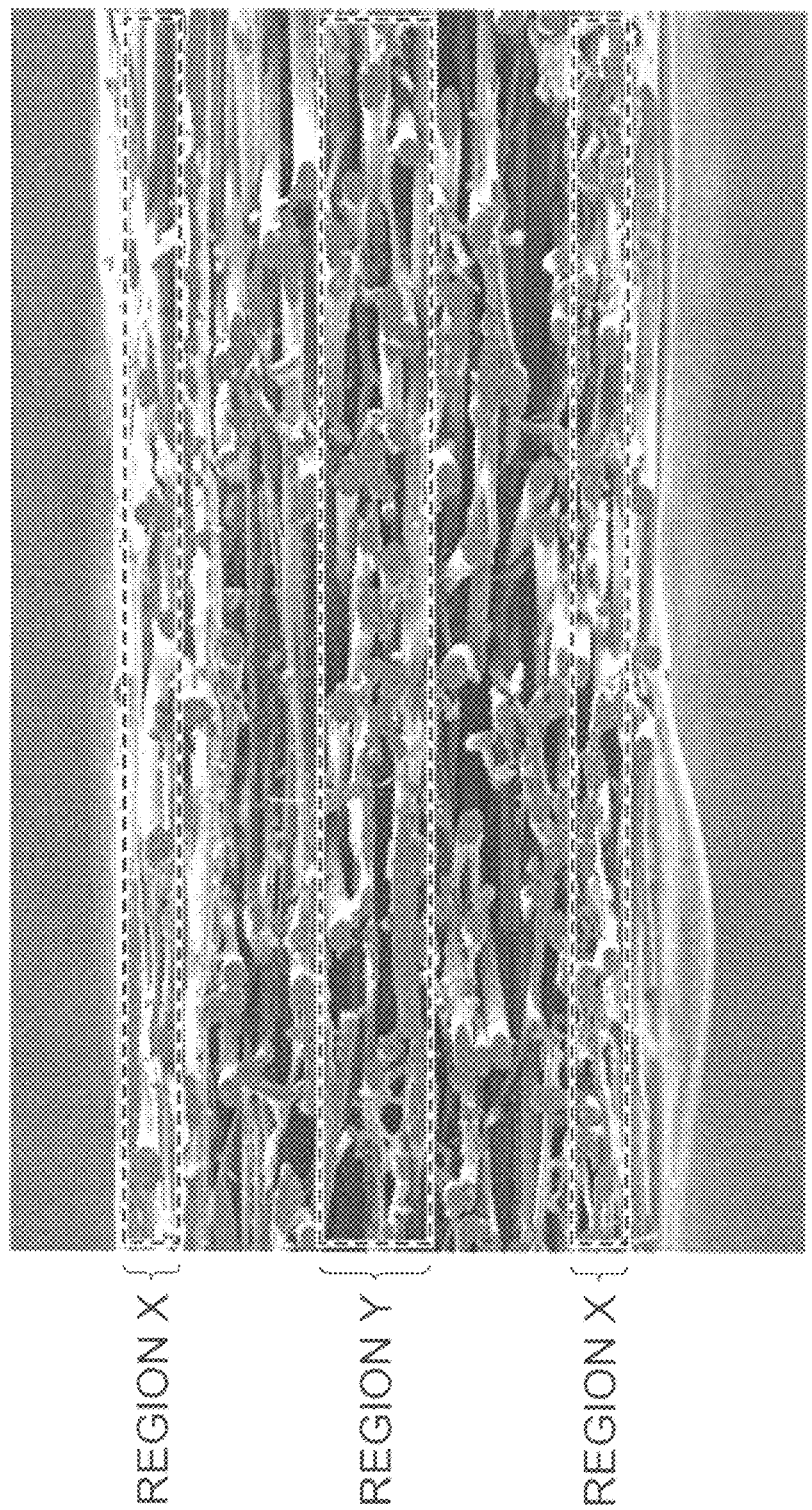
FIG. 4 is a drawing illustrating an example of a scanning electron microscopic image of the cross section of the porous electrode base material of Comparative Example of the invention.

When the average of measured angles between the short carbon fibers (A) and a horizontal surface is 3° or greater, or when the maximum value of measured angles between the short carbon fibers (A) and a horizontal surface is 10° or greater, it is determined that a three-dimensional entangled structure is formed (it has a three-dimensional entangled structure). When the average of measured angles between the short carbon fibers (A) and a horizontal surface is smaller than 3°, or when the maximum value of measured angles between the short carbon fibers (A) and a horizontal surface is smaller than 10°, it is determined that a three-dimensional entangled structure is not formed (it does not have a three-dimensional entangled structure). In particular, as shown in FIG. 2, a SEM (scanning electron microscope) photograph is taken at a cross section in a direction perpendicular to the sheet surface, and the short carbon fibers (A) to be measured are connected with a line (dotted line shown in FIG. 2) so that the angle between the line and the sheet surface may be measured. The number of spots to measure for calculating the average angle may be 50, for example. Line 1 in FIG. 2 is parallel to the sheet surface.

<<Membrane-electrode Assembly (MEA) and Solid Polymer Type Fuel Cell>>

The porous electrode base material of the invention can be suitably used for membrane-electrode assemblies of solid electrolyte fuel cells. Also, membrane-electrode assemblies using the porous electrode base materials of the invention can be preferably used for solid electrolyte fuel cells.

<<Precursor Sheet>>

During the process of the manufacturing method of the invention, a precursor sheet is produced at the step before the step [3] for carbonization treatment. Examples thereof include the following [1] to [6].

[1] A precursor sheet with a sheet-form structure having the short carbon fibers (A) bound by a phenolic resin (c) selected from a group consisting of a water soluble phenolic resin and a water dispersible phenolic resin, in which the carbon powder (d) is localized in the vicinity of the surface layer of a single side or both sides of the sheet-form structure.

[2] A precursor sheet with a sheet-form structure having the short carbon fibers (A) bound by a phenolic resin (c), in which a region having the short carbon fibers (A) and the carbon powder (d) bound by the phenolic resin (c) is localized in the vicinity of the surface layer of a single side or both sides of the sheet-form structure.

[3] A precursor sheet with a sheet-form structure having the short carbon fibers (A) bound by a phenolic resin (c), in which a region having the short carbon fibers (A) and the carbon powder (d) bound by the phenolic resin (c) is included in the vicinity of the surface layer of a single side or both sides of the sheet-form structure, the pore occupancy in the region X from the surface of a plane having the aforementioned region to the depth of 20 μm is less than 25%, and the pore occupancy in the region Y from the center of the structure to the depth of 40 μm in the thickness direction is 35 to 70%.

[4] A precursor sheet with a sheet-form structure having the short carbon fibers (A) and the carbon fiber precursor short fibers (b) bound by at least one phenolic resin (c) selected from a group consisting of a water soluble phenolic resin and a water dispersible phenolic resin, in which the short carbon fibers (A) form a three-dimensional entanglement structure in the sheet-form structure and the carbon powder (d) is localized in the vicinity of the surface layer of a single side or both sides of the sheet-form structure.

[5] A precursor sheet with a sheet-form structure having the short carbon fibers (A) and the carbon fiber precursor short fibers (b) bound by the phenolic resin (c), in which the short carbon fibers (A) form a three-dimensional entanglement structure in the sheet-form structure and a region having the short carbon fibers (A) and the carbon powder (d) bound by the phenolic resin (c) is localized in the vicinity of the surface layer of a single side or both sides of the sheet-form structure.

[6] A precursor sheet with a sheet-form structure having the short carbon fibers (A) and the carbon fiber precursor short fibers (b) bound by the phenolic resin (c), in which the short carbon fibers (A) form a three-dimensional entanglement structure in the sheet-form structure, a region having the short carbon fibers (A) and the carbon powder (d) bound by the phenolic resin (c) is included in the vicinity of the surface layer of a single side or both sides of the sheet-form structure, the pore occupancy in the region X from the surface of a plane having the aforementioned region to the depth of 20 μm is less than 25%, and the pore occupancy in the region Y from the center of the sheet-form structure to the depth of 40 μm in the thickness direction is 35 to 70%.

In the aforementioned [1] to [6], the phenolic resin (c) is preferably at least one phenolic resin (c) selected from a group consisting of a water soluble phenolic resin and a water dispersible phenolic resin.

In the above-described [1] and [4], the expression "the carbon powder (d) is localized in the vicinity of the surface layer of a single side or both sides of the sheet-form structure" means that, compared to the inside (inner layer) of the precursor sheet, the carbon powder (d) is present more on a surface, or on a surface and in the vicinity of a surface layer of the precursor sheet. Meanwhile, the "surface" indicates a surface which can be observed without performing a special processing like cutting or polishing. Meanwhile, "in the vicinity of the surface layer" indicates a region with a certain width in the thickness direction, including the surface. Specifically, (i) when the cross section of the precursor sheet is observed, pores in the vicinity of the surface layer are filled with the carbon powder (d) so that the pore occupancy is relatively low, and thus it is difficult to identify each fiber. On the other hand, the pore occupancy is relatively high in the inner layer, and thus it has a state which allows easy identification of each fiber. Further, it is preferable to have (ii) a state in which, when observation is made from the surface of the precursor sheet, the surface layer exhibits almost no fibers or pores other than the outermost surface when observing the surface as the surface of the porous electrode base material is coated with a mixture of the resin carbide (C) and the carbon powder (d).

With regard to the "pores in the vicinity of the surface layer are filled with the carbon powder (d) so that the pore occupancy is relatively low, and thus it is difficult to identify each fiber. On the other hand, the pore occupancy is relatively high in the inner layer, and thus it has a state which allows easy identification of each fiber" described above, it is more specifically as follows: when the region from the outermost layer of the porous electrode base material to the depth of 20 μm is X and the region from the center of the porous electrode base material to the depth of 40 μm in the thickness direction is Y, it is preferable that the pore occupancy in the region X be less than 25% and the pore occupancy in the region Y be 35 to 70%, and it is more preferable that the pore occupancy in the region X be less than 20% and the pore occupancy in the region Y be 40 to 65%.

Further, "a region having the short carbon fibers (A) and the carbon powder (d) bound by the phenolic resin (c) is localized in the vicinity of the surface layer of a single side or both sides of the sheet-form structure" described in the above [2] and [5] indicates, in addition to the aforementioned (i) and (ii), (iii) a state in which the shape of the particles derived from the carbon powder (d) can be identified from a photographic image for observing the surface of the precursor sheet.

EXAMPLES

The invention will be described in more detail based on Examples. Each physical property in Examples was measured as follows.

(1) Gas Permeability

Gas permeability is measured according to a method based on JIS P-8117. Using a Gurley Densometer, a test piece (porous electrode base material) was positioned between cells with a 3 mm diameter hole. Then, 200 mL of air was flowed through the hole under 1.29 kPa pressure, and the time for the air to pass through the hole was measured, and the gas permeability was calculated as follows.

Gas permeability (mL/hr/cm$^2$/Pa)=Amount of permeated gas (mL)/Permeation time (hr)/Area of permeation hole (cm$^2$)/Permeation pressure (Pa)

(2) Through-plane Resistance

The electric resistance of the porous electrode base material in the thickness direction (through-plane resistance) was measured by positioning a porous electrode base material between gold-plated copper plates under 0.6 MPa pressure exerted vertically of the copper plates, and electric current was flowed at a density of 10 mA/cm². It was obtained from the following formula.

Through-plane resistance (mΩ·cm²)=Measured resistance value (mΩ)×Area of test piece (cm²).

(3) Bulk Density

From the weight of a porous electrode base material per unit area and the later-described initial thickness of the porous electrode base material, the bulk density of the porous electrode base material was calculated as follows.

Bulk density (g/cm³)=Weight per unit area (g/m²)/Initial thickness (μm).

(4) Thickness

The thickness of the porous electrode base material was measured as follows using a micro sample pressure testing instrument Micro Autograph (trade name: MST-I, manufactured by Shimadzu Corporation). First, the parallel degree between a 50 mm-diameter upper platen (fixed type) and a 50 mm-diameter lower platen (ball-bearing type) was adjusted, nothing was sandwiched therebetween, and then a load rod was lowered at a stroke speed of 0.4 mm/min. When the pressure of 3 MPa was applied, the stroke of the load rod was immediately stopped, and the values at three displacement gauges between platens were each set at zero. Next, a 25 mm diameter test piece (porous electrode base material) was placed between the upper and lower platens and the load rod was lowered at a stroke speed of 0.4 mm/min. When a pressure of 0.05 MPa was applied on the test piece, the stroke of the load rod was immediately stopped, and 30 seconds later, the values at three displacement gauges between the platens were read, and their average value was determined as the thickness.

(5) Porosity of Region X or Region Y in Photographic Image for Cross Section Observation From a photographic image for cross section observation of the porous electrode base material, which has been cut out by using a cross section polisher, the porosity in the region X or region Y was measured as follows. The scanning electron microscopic image of the cross section obtained at a magnification ratio of 300 was subjected to the image analysis software (ImagePro), and according to binarization, it was fractionated into a pore part and the remaining part and the area ratio of the pore part in the whole region was calculated.

Example 1

As for the short carbon fibers (A), PAN-based carbon fibers with an average fiber diameter of 7 μm and an average fiber length of 3 mm were prepared. Also, as for the carbon fiber precursor short fibers (b1), short acrylic fibers with an average fiber diameter of 4 μm and an average fiber length of 3 mm were prepared (trade name D122, manufactured by Mitsubishi Rayon Co., Ltd.). In addition, as for the fibrillar fibers (b2), prepared was polyacrylonitrile-based pulp (b2-1) having numerous fibrils with a diameter of 3 μm or less branched out from fibrous stems formed by injection-coagulation. A sheet-form product and a three-dimensionally entangled-structure sheet formed by entanglement treatment were produced by the following wet continuous sheet forming method and by an entanglement treatment method using continuous jetting treatment of pressurized water.

* Wet Continuous Sheet Forming Method (1) Disaggregation of Short Carbon Fibers (A)

PAN-based carbon fibers with an average fiber diameter of 7 μM and an average fiber length of 3 mm were dispersed in water to have a fiber concentration of 1% (10 g/L), and put through a disc refiner (manufactured by Kumagai Riki Kogyo Co., Ltd.) for disaggregation treatment. Accordingly, disaggregated fiber slurry (SA) was obtained.

(2) Disaggregation of Carbon Fiber Precursor Short Fibers (b1)

As for carbon fiber precursor short fibers (b1), short acrylic fibers with an average fiber diameter of 4 μm and an average fiber length of 3 mm (trade name: D122, manufactured by Mitsubishi Rayon Co., Ltd.) were dispersed in water to have a fiber concentration of 1% (10 g/L). Accordingly, disaggregated fiber slurry (Sb1) was obtained.

(3) Disaggregation of Fibrillar Fibers (b2)

As for the fibrillar fibers (b2), polyacrylonitrile-based pulp having numerous fibrils with a diameter of 3 μm or less branched out from fibrous stems formed by injection-coagulation were dispersed in water to have a fiber concentration of 1% (10 g/L). Accordingly, disaggregated fiber slurry (Sb2) was obtained.

(4) Preparing Slurry for Sheet Making

The disaggregated fiber slurry (SA), the disaggregated fiber slurry (Sb1) and the disaggregated fiber slurry (Sb2) and a diluent were measured and put into a slurry supply tank, with a mass ratio of short carbon fibers (A) to carbon fiber precursor short fibers (b1) and to fibrillar fibers (b2) at 60:20:20, and with a fiber concentration in slurry (hereinafter referred to as flock) at 1.7 g/L. Furthermore, polyacrylamide was added to prepare slurry for making a sheet with a viscosity of 22 centipoise.

* Apparatus for Treatment

The apparatus is constituted as follows: a sheet-form product conveyor equipped with a belt formed by connecting 60 cm wide×585 cm long plastic nets of plain mesh and a net driver to rotate the net continuously; a sheet forming slurry supply apparatus with a slurry supply width of 48 cm and a slurry supply amount of 30 L/min; a reduced-pressure dehydration apparatus positioned under the net; and a pressurized water jetting treatment apparatus to be described below. Three nozzles of two different types as shown in Table 1 were used as water jet nozzles.

TABLE 1

| Nozzle | Pore diameter φ (Diameter) | Number of pores | Pore pitch in width direction | Array | Effective width of nozzle |
|---|---|---|---|---|---|
| 1 | 0.15 mm | 501 | 1 mm | Single row array | 500 mm |
| 2 | 0.15 mm | 501 | 1 mm | Single row array | 500 mm |
| 3 | 0.15 mm | 1002 | 1.5 mm | Triple row array | 500 mm |

(5) Producing Sheet-form Product and Performing Three-dimensional Entanglement Treatment Through Pressurized Water Jetting On the net of an apparatus for treatment, the above sheet forming slurry was supplied using a metering pump. The flow of sheet forming slurry was widened to a predetermined size by going through a flow box for setting a uniform flow. After that, the slurry was put through a section for settling and natural dehydration, and the slurry was completely dewatered using a dehydration apparatus under reduced pressure. Then, wet web with a target weight per unit area of 65 g/m² was loaded on the net (steps [1] and [7]). When the process was completed, the sheet-form product was put under water jet nozzles positioned in the back of the test instrument so that pressurized water jetting pressures at 3 MPa (nozzle 1), 3 MPa (nozzle 2) and 4 MPa (nozzle 3) in that order were exerted for entanglement treatment (step [4]).

Using a Pin Tenter tester (trade name: PT-2A-400, manufactured by Tsujii Dyeing Machine Manufacturing Co., Ltd.), the sheet-form product after the entanglement treatment was dried at 150° C. for 3 minutes (step [7]), and a three-dimensionally entangled-structure sheet with a weight per unit area of 64 g/m² was obtained. In the obtained three-dimensionally entangled-structure sheet, it was observed that the carbon fiber precursor short fibers (b1) and the fibrillar fibers (b2) are in a well dispersed state.

(6) Step for Adding Resin and Drying

Next, as the resin (c) used for the dispersion (e), an aqueous dispersion of two kinds of resol type phenolic resin (trade names PR-14170 and PR-55464, manufactured by Sumitomo Bakelite Co., Ltd.) was prepared, which was then diluted with pure water to have resin to solid matter ratio of 7:3 and the total resin solid content of 10% by mass of the aqueous resin dispersion. In addition, pyrolytic graphite (trade name: PC-H, manufactured by Ito Kokuen Co., Ltd.) was added as the carbon powder (d) such that the ratio of carbon powder/resin solid matter is 1.0, to yield an addition solution. This addition solution was flowed on both sides of the three-dimensional entangled structure sheet, one side at each time (step [2]). After removing the extra resin (c) and carbon powder (d) by nipping, water in the sheet was sufficiently dried at 80° C. (step [6]). Accordingly, a precursor sheet attached with the resin nonvolatiles and carbon powder, in an amount of 48% by mass in total, was obtained.

(7) Heating and Compression

Next, the precursor sheet was continuously heated and compressed using a continuous heating and compression apparatus equipped with a pair of endless belts disclosed in JP 3699447 B1 (double belt press apparatus: DBP) (step [5]), for example, and an intermediate base material with flattened surface was obtained (sheet thickness: 240 μm, width: 40 cm). The preheating temperature in the preheating zone was 150° C., the preheating time was 5 minutes, the temperature in the heating and compression zone was 230° C., and the press pressure was linear pressure at $8.0 \times 10^4$ N/m. Meanwhile, the DBP was passed through while having it sandwiched between two releasing papers so that the precursor sheet would not stick to the belt.

(8) Carbonization Treatment

The intermediate base material was carbonized in inert gas (nitrogen) atmosphere at 2200° C. (step [3]), and a porous carbon electrode base material was obtained in which the short carbon fibers (A) are bound by the resin carbide in fibrillar shape (carbon fibers (B)) and the resin carbide (C) in amorphous shape. FIG. 1 shows a photograph to observe the surface of the obtained porous carbon electrode base material, which is taken by a scanning electron microscope. FIG. 2 shows a photograph to observe the cross section. The obtained porous electrode base material showed no surface contraction at the time of heat treatment, and each of thickness and through-plane resistance was good. As shown in FIG. 1, it was confirmed that the short carbon fibers (A) dispersed in a three-dimensional structure were bound to each other by the resin carbide in fibrillar shape (carbon fibers (B)) and the amorphous resin carbide (C), and also the carbon powder (d) was localized on the surface. Even when a surface compression load of 3 MPa was applied on the porous electrode base material, it maintained the sheet shape.

Example 2

The porous electrode base material was obtained in the same manner as Example 1 except the followings.
As the fibrillar fibers (b2) used for producing a sheet-form product, splittable acrylic sea-island composite short fibers consisting of diacetate (cellulose acetate) and an acrylic polymer to be fibrillated by beating (trade name: Vonnel M.V.P.-C651, average fiber length: 3 mm, manufactured by Mitsubishi Rayon Co., Ltd.), on which beating was performed, was used (fibers (b2-2)).
The mass ratio of the short carbon fibers (A) to the carbon fiber precursor short fibers (b1) and to the fibrillar fibers (b2) that are used for producing the sheet-form product was 70:10:20 and the target weight per unit area was 55 g/m².
The pressurized water jetting pressures for entanglement treatment was set at 2 MPa (nozzle 1), 2 MPa (nozzle 2) and 2 MPa (nozzle 3).
An aqueous dispersion of two kinds of resol type phenolic resin (trade names: PR-14170 and PR-55464, manufactured by Sumitomo Bakelite Co., Ltd.) was used as aqueous resin dispersion used for the resin addition solution, and the solid matter ratio between those two resins was 5:5.

Example 3

The porous electrode base material was obtained in the same manner as Example 1 except the followings.
When a slurry for sheet making is produced, the mass ratio of short carbon fibers (A) to carbon fiber precursor short fibers (b1) and to fibrillar fibers (b2) was adjusted to 80:0:20.
As an aqueous dispersion of resin used for the resin addition solution, an aqueous dispersion of one kind of resol type phenolic resin (trade name: PR-55464, manufactured by Sumitomo Bakelite Co., Ltd.) was prepared and the resin solid matter concentration in the resin addition solution was adjusted to 12% by mass.
Carbon powder/resin solid matter ratio was 0.8.
As a method for resin addition, a method in which the addition solution is transported by using a roller pump (trade name: RP-1000, manufactured by Tokyo Rikakikai Co., Ltd.) (pump revolution number 80 rpm) and spraying is made by using a vortex-flow atomization nozzle (trade name: AM45, manufactured by Atomax) installed at a discharge port (air pressure of 0.2 MPa) is used.
Heating and compression was performed in the batch press mode, the temperature was 180° C., the preheating time was 0 second, the pressure was 6 MPa, and the heating and compression time was 1 minute.

Example 4

The porous electrode base material was obtained in the same manner as Example 1 except the followings.
When a slurry for sheet making is produced, the mass ratio of short carbon fibers (A) to carbon fiber precursor short fibers (b1) and to fibrillar fibers (b2) was adjusted to 50:30:20 and the target weight per unit area was 50 g/m².

The pressurized water jetting pressures for entanglement treatment was set at 2 MPa (nozzle 1), 2 MPa (nozzle 2) and 2 MPa (nozzle 3).

As an aqueous dispersion of resin used for the resin addition solution, an aqueous dispersion of one kind of resol type phenolic resin (trade name: PR-14170, manufactured by Sumitomo Bakelite Co., Ltd.) was prepared and the resin solid matter concentration in the resin addition solution was adjusted to 8% by mass.

The ratio between ketjen black (trade name: CARBON ECP, manufactured by Lion Corporation) carbon powder as the carbon powder (d)/resin solid matter was 0.5.

Heating and compression was performed in the batch press mode, the temperature was 180° C., the preheating time was 0 second, the pressure was 4.5 MPa, and the heating and compression time was 3 minutes.

Comparative Example 1

The porous electrode base material was obtained in the same manner as Example 1 except the followings.

As the fibrillar fibers (b2) used for producing a sheet-form product, splittable acrylic sea-island composite short fibers consisting of diacetate (cellulose acetate) and an acrylic polymer to be fibrillated by beating (trade name: Vonnel M.V.P.-C651, average fiber length: 3 mm, manufactured by Mitsubishi Rayon Co., Ltd.), on which beating was performed, was used (fibers (b2-2)).

The carbon powder (d) was not added.

As a method for resin addition, a method in which the addition solution is transported by using a roller pump (trade name: RP-1000, manufactured by Tokyo Rikakikai Co., Ltd.) (pump revolution number 80 rpm) and spraying is made by using a vortex-flow atomization nozzle (trade name: AM45, manufactured by Atomax) installed at a discharge port (air pressure of 0.2 MPa) is used.

Example 13

(1) Producing Membrane-electrode Assembly (MEA)

Two sets of the porous electrode base materials obtained in Example 1 were prepared for cathode and anode porous electrode base materials. A laminate was prepared in which a catalyst layer (catalyst layer area: 25 cm², amount of attached Pt: 0.3 mg/cm²) made of catalyst-carrying carbon (catalyst: Pt, carrying amount of catalyst: 50% by mass) was formed on both surfaces of perfluorosulfonate-based polymer electrolyte membrane (thickness: 30 μm). The laminate was sandwiched by the cathode and anode porous electrode base materials, which were then bonded to each other. Accordingly, an MEA was obtained.

(2) Evaluation of Fuel-Cell Properties of MEA

The obtained MEA was sandwiched by two carbon separators with a concertina gas flow channel to form a polymer electrolyte fuel cell (single cell). The fuel cell properties were evaluated by measuring the current density-voltage characteristics of the single cell. Hydrogen gas was used as a fuel gas, and air was used as an oxidation gas. The single cell was set at the temperature of 80° C., the fuel gas utilization rate was 60% and the oxidation gas utilization rate was 40%. The fuel gas and oxidation gas were each humidified by passing through bubblers each set at 50° C. As a result, it was found that the properties were good, showing a cell voltage of the fuel cell at 0.610 V and the internal resistance of the cell at 5.9 mΩ when current density was 0.4 A/cm².

Example 5

A bundle of polyacrylonitrile (PAN)-based fibers having an average diameter of 7 μm, which has been cut to have a length of 3 mm, was beaten in water, and when 80 parts by mass of the short fiber bundle were sufficiently dispersed, 20 parts of short fibers of polyvinyl alcohol (PVA) (trade name: VBP105-1, manufactured by Kuraray Co., Ltd.) as a binder were homogeneously dispersed therein. Then, by using a standard angle type sheet machine, sheet making was performed. The mass per unit area of the obtained carbon fiber paper was 43 g/m².

Next, as the resin (c) used for the dispersion (e), an aqueous dispersion of a phenolic resin (trade names PR-9800D, manufactured by Sumitomo Bakelite Co., Ltd.) was prepared, which was then diluted with pure water to have the resin solid content of 10% by mass. In addition, ketjen black (trade name: CARBON ECP, manufactured by Lion Corporation) as the carbon powder (d) was added such that the carbon powder (d)/resin solid matter ratio is 0.01, thus yielding the dispersion (e).

This dispersion (e) was added dropwise on both sides of the carbon fiber paper (step [2]), and by sufficiently drying water in the sheet at 80° C. (step [6]), a precursor sheet attached with the resin nonvolatiles and carbon powder, in an amount of 112% by mass in total, was obtained.

The above precursor sheet was subjected to batch pressing by applying a pressure of 6 MPa for 3 minutes at the temperature of 180° C. without preheating to cure the resin (c). Then, according to the carbonization in inert gas (nitrogen) atmosphere at 2000° C. (step [3]), a porous carbon electrode base material was obtained.

Example 6

The porous electrode base material was obtained in the same manner as Example 5 except the followings.

As the carbon powder (d), Denka Black (trade name: Denka Black, particulate product, manufactured by Denki Kagaku Kogyo K.K.) was used.

The carbon powder/resin solid matter ratio was 0.1.

The method for adding the dispersion (e) to carbon fiber paper was based on spraying.

Example 7

The porous electrode base material was obtained in the same manner as Example 6 except the followings.

As the resin (c), an aqueous dispersion of a phenolic resin (trade name: PR-14170, manufactured by Sumitomo Bakelite Co., Ltd.) was used.

The carbon powder/resin solid matter ratio was 0.001.

Example 8

The porous electrode base material was obtained in the same manner as Example 7 except the followings.

As the carbon powder (d), Vulcan was used.

The carbon powder/resin solid matter ratio was 0.1.

Example 9

The porous electrode base material was obtained in the same manner as Example 5 except the followings.

As the resin (c), an aqueous dispersion of a phenolic resin (trade name: PR-55464, manufactured by Sumitomo Bakelite Co., Ltd.) was used.

As the carbon powder (d), flake graphite (trade name: Z-5F, manufactured by Itoh Graphite Co., Ltd.) was used.

The carbon powder/resin solid matter ratio was 2.0.

The method for adding the dispersion (e) to carbon fiber paper was based on spraying.

Example 10

The porous electrode base material was obtained in the same manner as Example 9 except the followings.

As the carbon powder (d), spherical graphite (trade name: SG-BL40, manufactured by Itoh Graphite Co., Ltd.) was used.

The carbon powder/resin solid matter ratio was 3.0.

Compositions and conditions of the sheet-form products and precursor sheets used for manufacturing the porous electrode base materials of Examples 1 to 10 and Comparative Example 1, and the evaluation results of the porous electrode base material are shown in Table 2.

Example 11

Example for Precursor Sheet

By using a cross section polisher, a cross section was created in the precursor sheet in the middle of obtaining the porous electrode base material of Example 1 and a photographic image for cross section observation was obtained by using scanning electron microscopy at a magnification ratio of 300. The image was then subjected to the image analysis software (ImagePro), and according to binarization, it was fractionated into a pore part and the remaining part and the area ratio of the pore part in the whole region was calculated. As a result, the porosity in the region X was 3% and the porosity in the region Y was 44%.

Example 12

Example of Water Repellent Treatment

A dispersion having polytetrafluoroethylene (PTFE) particles dispersed therein (trade name: 31-JR, manufactured by Du Pont-Mitsui Fluorochemicals Co., Ltd.) was prepared and dilution was made by adding pure water such that the solid matter is 20% by mass. The porous electrode base material obtained in Example 1 was impregnated in the diluted PTFE dispersion. After nipping, it was placed in a far-infrared furnace set at 120° C. for drying. Subsequently, by using the furnace having an atmosphere set at 360° C., a heating treatment was performed for 20 minutes to calcine the PTFE, and therefore a porous electrode base material completed with a water repellent treatment was obtained.

TABLE 2

| | | | Example | | | | | |
|---|---|---|---|---|---|---|---|---|
| | | | 1 | 2 | 3 | 4 | 5 | 6 |
| Sheet-form product | Carbon short fibers (A) | Parts by mass | 60 | 70 | 80 | 50 | 80 | 80 |
| | Carbon fiber precursor short fibers (b1) | Parts by mass | 20 | 10 | — | 30 | — | — |
| | Fibrillar fibers (b2-1)*[1] | Parts by mass | 20 | — | 20 | 20 | — | — |
| | (b2) (b2-2)*[2] | Parts by mass | — | 20 | — | — | — | — |
| | Polyvinyl alcohol fibers | Parts by mass | — | — | — | — | 20 | 20 |
| | Weight per unit area of sheet-form product | g/m² | 64 | 54 | 65 | 51 | 43 | 44 |
| | Pressurized water jetting pressure of nozzles 1, 2, and 3 | MPa | 3.3.4 | 2.2.2 | 3.3.4 | 2.2.2 | — | — |
| Precursor sheet | Phenolic resin (trade name), mixing ratio | | PR14170: PR55464 = 7:3 | PR14170: PR55464 = 5:5 | PR55464 | PR14170 | PR9800D | PR9800D |
| | State at the time of adding phenolic resin | | Water dispersible | Water dispersible | Water dispersible | Water dispersible | Water soluble | Water soluble |
| | Solid matter concentration of phenolic resin | % by mass | 10 | 10 | 12 | 8 | 10 | 10 |
| | Product name of carbon powder | | Pyrolytic graphite PC-H | Pyrolytic graphite PC-H | Pyrolytic graphite PC-H | Ketjen black ECP | Ketjen black ECP | Powder product of Denka black |
| | Carbon powder/resin solid matter ratio | | 1.0 | 1.0 | 0.8 | 0.5 | 0.01 | 0.1 |
| | Method for adding resin carbon powder | | Flowing | Flowing | Spray | Flowing | Dropwise addition | Spray |
| | Weight per unit area of precursor sheet | g/m² | 112 | 96 | 105 | 100 | 91 | 87 |
| | Heating and compression mode | | Continuous | Continuous | Batch | Batch | Batch | Batch |
| Porous electrode base material | Weight per unit area | g/m² | 69 | 69 | 71 | 60 | 43 | 45 |
| | Thickness | mm | 170 | 176 | 179 | 162 | 153 | 221 |
| | Bulk density | g/cm³ | 0.40 | 0.39 | 0.40 | 0.37 | 0.28 | 0.20 |
| | Gas permeability | ml/hr/cm²/Pa | 150 | 330 | 360 | 130 | 320 | 490 |
| | Through-plane resistance | mW·cm² | 5.8 | 4.5 | 4.2 | 5.4 | 2.9 | 3.4 |
| | Maintaining sheet shape after applying 3 MPa | | A | A | A | A | A | A |

TABLE 2-continued

|  |  |  | Example | | | | Comparative Example |
|---|---|---|---|---|---|---|---|
|  |  |  | 7 | 8 | 9 | 10 | 1 |
| Porosity in region X in photographic image for cross section observation | | % | 5 | 6 | 5 | 9 | 15 | 14 |
| Porosity in region Y in photographic image for cross section observation | | % | 65 | 63 | 69 | 63 | 75 | 74 |

| | | | Example | | | | Comparative Example |
|---|---|---|---|---|---|---|---|
| | | | 7 | 8 | 9 | 10 | 1 |
| Sheet-form product | Carbon short fibers (A) | Parts by mass | 80 | 80 | 80 | 80 | 60 |
| | Carbon fiber precursor short fibers (b1) | Parts by mass | — | — | — | — | 20 |
| | Fibrillar fibers (b2-1)*1 | Parts by mass | — | — | — | — | — |
| | (b2) (b2-2)*2 | Parts by mass | — | — | — | — | 20 |
| | Polyvinyl alcohol fibers | Parts by mass | 20 | 20 | 20 | 20 | — |
| | Weight per unit area of sheet-form product | g/m² | 27 | 22 | 53 | 56 | 63 |
| | Pressurized water jetting pressure of nozzles 1, 2, and 3 | MPa | — | — | — | — | 3.3.4 |
| Precursor sheet | Phenolic resin (trade name), mixing ratio | | PR14170 | PR14170 | PR55464 | PR55464 | PR14170: PR55464 = 7:3 |
| | State at the time of adding phenolic resin | | Water dispersible | Water dispersible | Water dispersible | Water dispersible | |
| | Solid matter concentration of phenolic resin | % by mass | 10 | 10 | 10 | 10 | 10 |
| | Product name of carbon powder | | Powder product of Denka black | Vulcan | Flake graphite Z-5F | Spherical graphite SG-BL40 | — |
| | Carbon powder/resin solid matter ratio | | 0.001 | 0.1 | 2.0 | 3.0 | — |
| | Method for adding resin carbon powder | | Spray | Spray | Spray | Dropwise addition | Spray |
| | Weight per unit area of precursor sheet | g/m² | 52 | 42 | 98 | 150 | 89 |
| | Heating and compression mode | | Batch | Batch | Batch | Batch | Continuous |
| Porous electrode base material | Weight per unit area | g/m² | 32 | 30 | 78 | 119 | 56 |
| | Thickness | mm | 107 | 90 | 225 | 284 | 177 |
| | Bulk density | g/cm³ | 0.30 | 0.33 | 0.35 | 0.42 | 0.32 |
| | Gas permeability | ml/hr/cm²/Pa | 540 | 400 | 280 | 180 | 520 |
| | Through-plane resistance | mW · cm² | 3.0 | 2.5 | 4.0 | 7.7 | 7.4 |
| | Maintaining sheet shape after applying 3 MPa | | A | A | A | A | A |
| | Porosity in region X in photographic image for cross section observation | % | 20 | 15 | 3 | 5 | 42 |
| | Porosity in region Y in photographic image for cross section observation | % | 70 | 72 | 74 | 69 | 58 |

*1)(b2-1): Polyacrylonitrile-based pulp with numerous branched fibrils
*2)(b2-2): Those obtained by beating treatment of splittable acrylic sea-island composite short fibers which are composed of an acrylic polymer and acetic acid cellulose and fibrilized by beating

INDUSTRIAL APPLICABILITY

Because the porous electrode base material has low production cost and sufficient conductivity, and exhibits a good power generation performance even without MPL, it is useful for manufacturing a membrane-electrode assembly and a solid polymer type fuel cell.

EXPLANATIONS OF LETTERS OR NUMERALS

A: Short carbon fibers (A)
B: Carbon fibers (B)
C: Resin carbide (C)
D: Carbon powder (d)
1: Line parallel to sheet surface

The invention claimed is:

1. A method for manufacturing a porous electrode base material, the method comprising:
   [1] dispersing short carbon fibers (A) to form a sheet-form product;
   [2] adding, to the sheet-form product, at least one phenolic resin (c) comprising a water soluble phenolic resin and a water dispersible phenolic resin along with carbon powder (d) to form a precursor sheet;
   [3] carbonizing the precursor sheet at a temperature of 1000° C. or higher, after said adding [2]; and
   [4] after said dispersing [1] and before said adding [2], performing an entanglement treatment of the sheet-form product.

2. The manufacturing method according to claim 1, further comprising:

[7] after said performing [4] and before said adding [2], performing a first drying treatment of the sheet-form product,

[5] after said adding [2] and before said carbonizing [3], heating and compressing the precursor sheet at a temperature of 100 to 250° C., and

[6] after said adding [2] and before said heating and compressing [5], performing a second drying treatment of the precursor sheet.

3. The manufacturing method according to claim 1, wherein an average particle diameter of substantial particles or agglomerates of the carbon powder (d) in said adding [2] is 0.1 to 50 μm.

4. The manufacturing method according to claim 1, further comprising:

[8] after said carbonizing [3], adding a fluorine-based resin dispersion with a solid content of 1 to 30% by mass to the porous electrode base material followed by further drying and performing a heat treatment at 300 to 390° C.

5. A porous electrode base material, comprising:
a sheet-form structure having short carbon fibers (A) bound by a resin carbide (C) derived from a water soluble phenolic resin and a water dispersible phenolic resin,
wherein carbon powder (d) is localized in the vicinity of a surface layer of a single side or both sides of the sheet-form structure.

6. The porous electrode base material of claim 5, wherein a region having the short carbon fibers (A) and carbon powder (d) bound by the resin carbide (C) is localized in the vicinity of a surface layer of a single side or both sides of the sheet-form structure.

7. The porous electrode base material of claim 5, wherein a region having the short carbon fibers (A) and carbon powder (d) bound by the resin carbide (C) is included in the vicinity of a surface layer of a single side or both sides of the sheet-form structure,
a pore occupancy in a region X from a surface of a plane having the aforementioned region to a depth of 20 μm is less than 30%, and
a pore occupancy in a region Y from center of the sheet-form structure to a depth of 40 μm in a thickness direction is 50 to 90%.

8. A porous electrode base material, comprising:
a sheet-form structure having short carbon fibers (A) bound by carbon fibers (B) with a fiber diameter of 0.1 to 5 μm and a resin carbide (C) derived from a water soluble phenolic resin and a water dispersible phenolic resin,
wherein the short carbon fibers (A) form a three-dimensional entanglement structure in the sheet-form structure, and
carbon powder (d) is localized in the vicinity of a surface layer of a single side or both sides of the sheet-form structure.

9. The porous electrode base material of claim 8, wherein
a region having the short carbon fibers (A) and carbon powder (d) bound by the resin carbide (C) is localized in the vicinity of a surface layer of a single side or both sides of the sheet-form structure.

10. The porous electrode base material of claim 8, wherein
a region having the short carbon fibers (A) and carbon powder (d) bound by the resin carbide (C) is included in the vicinity of a surface layer of a single side or both sides of the sheet-form structure,
a pore occupancy in a region X from a surface of a plane having the aforementioned region to a depth of 20μm is less than 30%, and
a pore occupancy in a region Y from center of the sheet-form structure to a depth of 40 μm in a thickness direction is 50 to 90%.

11. A precursor sheet, comprising:
a sheet-form structure having short carbon fibers (A) bound by at least one phenolic resin (c) comprising a water soluble phenolic resin and a water dispersible phenolic resin,
wherein carbon powder (d) is localized in the vicinity of a surface layer of a single side or both sides of the sheet-form structure.

12. A precursor sheet, comprising:
a sheet-form structure having short carbon fibers (A) bound by at least one phenolic resin (c) comprising a water soluble phenolic resin and a water dispersible phenolic resin,
wherein a region having the short carbon fibers (A) and carbon powder (d) bound by the phenolic resin (c) is localized in the vicinity of a surface layer of a single side or both sides of the sheet-form structure.

13. A precursor sheet, comprising:
a sheet-form structure having short carbon fibers (A) bound by at least one phenolic resin (c) comprising a water soluble phenolic resin and a water dispersible phenolic resin,
wherein a region having the short carbon fibers (A) and carbon powder (d) bound by the phenolic resin (c) is included in the vicinity of a surface layer of a single side or both sides of the sheet-form structure,
a pore occupancy in a region X from a surface of a plane having the aforementioned region to a depth of 20 μm is less than 25%, and
a pore occupancy in a region Y from center of the sheet-form structure to a depth of 40 μm in a thickness direction is 35 to 70%.

14. A precursor sheet, comprising:
a sheet-form structure having short carbon fibers (A) and carbon fiber precursor short fibers (b) bound by at least one phenolic resin (c) comprising a water soluble phenolic resin and a water dispersible phenolic resin,
wherein the short carbon fibers (A) form a three-dimensional entanglement structure in the sheet-form structure, and
a region having the short carbon fibers (A) and carbon powder (d) bound by the phenolic resin (c) is localized in the vicinity of a surface layer of a single side or both sides of the sheet-form structure.

15. The method of claim 1, wherein the sheet-form product, prior to [2] adding the phenolic resin (c), does not comprise a binder.

16. The method of claim 1, wherein the process does not comprise organic solvent removal from the sheet-form product, prior to [2] adding the phenolic resin (c).

* * * * *